(12) United States Patent
Kawamura et al.

(10) Patent No.: US 10,752,104 B2
(45) Date of Patent: Aug. 25, 2020

(54) BEARING DEVICE FOR WHEELS WITH AUXILIARY POWER DEVICE

(71) Applicant: NTN CORPORATION, Osaka (JP)

(72) Inventors: Mitsuo Kawamura, Iwata (JP); Kentaro Nishikawa, Iwata (JP); Tomomi Ishikawa, Iwata (JP); Takushi Matsuto, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/360,714

(22) Filed: Mar. 21, 2019

(65) Prior Publication Data

US 2019/0248225 A1 Aug. 15, 2019

Related U.S. Application Data

(63) Continuation of application No. PCT/JP2017/033546, filed on Sep. 15, 2017.

(30) Foreign Application Priority Data

Sep. 21, 2016 (JP) .................................. 2016-184295
Sep. 4, 2017 (JP) .................................. 2017-169222

(51) Int. Cl.
*B60K 7/00* (2006.01)
*B60L 7/10* (2006.01)
(Continued)

(52) U.S. Cl.
CPC .............. *B60K 7/0007* (2013.01); *B60K 7/00* (2013.01); *F16C 19/00* (2013.01); *F16C 19/186* (2013.01);
(Continued)

(58) Field of Classification Search
CPC .. B60K 7/0007; B60K 7/0038; B60K 7/0092; B60L 2220/44; B60L 2220/46
(Continued)

(56) References Cited

U.S. PATENT DOCUMENTS 5,087,229 A * 2/1992 Hewko ................ B60K 7/0007
180/65.51
5,150,763 A * 9/1992 Yamashita ........... B60K 7/0007
180/242
(Continued)

FOREIGN PATENT DOCUMENTS

EP 1380459 1/2004
EP 3023263 5/2016
(Continued)

OTHER PUBLICATIONS

English Translation by WIPO of the International Preliminary Report on Patentability dated Apr. 4, 2019 in corresponding International Patent Application No. PCT/JP2017/033546 (7 pages).
(Continued)

*Primary Examiner* — Jeffrey J Restifo

(57) ABSTRACT

An auxiliary power unit equipped wheel support bearing assembly is provided which includes a wheel support bearing assembly and an auxiliary power unit. The auxiliary power unit is of a direct drive design that includes a stator mounted to a stationary ring of the wheel support bearing assembly and a motor rotor mounted to a rotational ring of the wheel support bearing assembly. An entirety of the auxiliary power unit is sized to extend less than an outer peripheral segment of a brake rotor, with the outer peripheral segment defining an area against which a brake caliper is intended to be pushed. The auxiliary power unit is, with respect to an axial direction, sized to be situated between a hub flange of the wheel support bearing assembly and a mounting face of the wheel support bearing assembly for mounting to a vehicle body of a vehicle.

12 Claims, 14 Drawing Sheets

(51) Int. Cl.
*F16C 41/00* (2006.01)
*F16C 19/18* (2006.01)
*F16C 19/00* (2006.01)
*F16D 65/18* (2006.01)
*H02K 11/21* (2016.01)
*H02K 7/00* (2006.01)
*H02K 7/08* (2006.01)
*H02K 7/102* (2006.01)
*H02K 21/22* (2006.01)
*F16D 55/225* (2006.01)

(52) U.S. Cl.
CPC ............ *F16C 41/004* (2013.01); *F16D 65/18* (2013.01); *H02K 7/006* (2013.01); *H02K 7/085* (2013.01); *H02K 7/102* (2013.01); *H02K 11/21* (2016.01); *H02K 21/22* (2013.01); *B60K 2007/0092* (2013.01); *B60L 7/10* (2013.01); *F16C 2326/02* (2013.01); *F16D 55/225* (2013.01)

(58) Field of Classification Search
USPC ...................................................... 180/65.51
See application file for complete search history.

(56) References Cited

U.S. PATENT DOCUMENTS

| | | | | |
|---|---|---|---|---|
| 5,156,579 A * | 10/1992 | Wakuta | ................. | H02K 7/116 475/161 |
| 5,163,528 A * | 11/1992 | Kawamoto | .......... | B60K 7/0007 180/65.51 |
| 5,382,854 A * | 1/1995 | Kawamoto | .......... | B60K 7/0007 180/65.6 |
| 5,600,191 A * | 2/1997 | Yang | ........................ | H02K 7/10 310/67 R |
| 5,691,584 A * | 11/1997 | Toida | .................... | B60K 7/0007 180/65.51 |
| 6,768,932 B2 * | 7/2004 | Claypole | ................. | B60L 58/40 700/279 |
| 7,228,928 B2 * | 6/2007 | Mizutani | ................. | B60L 1/003 180/65.51 |
| 7,306,065 B2 * | 12/2007 | Nagaya | .................... | B60G 3/20 180/65.51 |
| 7,350,605 B2 * | 4/2008 | Mizutani | .............. | B60K 7/0007 180/65.51 |
| 7,445,067 B2 * | 11/2008 | Marsh | ...................... | B60G 3/00 180/65.51 |
| 7,528,518 B2 * | 5/2009 | Maeda | ...................... | B60K 6/26 310/67 R |
| 7,530,416 B2 * | 5/2009 | Suzuki | ................. | B60K 7/0007 180/65.51 |
| 7,537,071 B2 * | 5/2009 | Kamiya | .................... | B60G 3/20 180/298 |
| 7,614,467 B2 * | 11/2009 | Suzuki | ................. | B60K 7/0007 180/65.1 |
| 7,641,010 B2 * | 1/2010 | Mizutani | .............. | B60K 7/0007 180/65.1 |
| 7,703,780 B2 * | 4/2010 | Mizutani | ................. | B60G 3/20 280/124.1 |
| 7,735,588 B2 * | 6/2010 | Murata | .................... | B60G 3/20 180/65.51 |
| 7,789,178 B2 * | 9/2010 | Mizutani | ................. | B60G 3/20 180/65.51 |
| 7,828,095 B2 * | 11/2010 | Murata | ................ | B60K 7/0007 180/65.1 |
| 7,938,211 B2 * | 5/2011 | Yoshino | ............... | B60K 7/0007 180/65.51 |
| 7,958,959 B2 * | 6/2011 | Yogo | ........................ | B60G 3/20 180/65.51 |
| 8,002,060 B2 * | 8/2011 | Komatsu | .............. | B60K 7/0007 180/65.51 |
| 8,186,467 B2 * | 5/2012 | Yoshino | ............... | B60K 7/0007 180/65.51 |
| 8,459,386 B2 * | 6/2013 | Pickholz | .............. | B60K 7/0007 180/65.31 |
| 8,596,395 B2 * | 12/2013 | Hirano | ................. | B60K 7/0007 180/65.51 |
| 8,720,623 B1 * | 5/2014 | Kim | ..................... | B60K 17/043 180/65.51 |
| 8,863,873 B2 * | 10/2014 | Lee | ........................ | B60K 7/0007 180/65.51 |
| 8,863,874 B2 * | 10/2014 | Lee | ........................ | B60K 7/0007 180/65.51 |
| 9,233,604 B2 * | 1/2016 | Yamamoto | .......... | B60K 17/046 |
| 9,381,802 B2 * | 7/2016 | Figuered | .............. | B60K 7/0007 |
| 9,387,758 B2 * | 7/2016 | Heinen | ................... | F16D 65/78 |
| 10,017,054 B2 * | 7/2018 | Wu | ........................ | B60L 50/66 |
| 10,047,808 B2 * | 8/2018 | Szewczyk | ............ | B60B 25/004 |
| 10,150,335 B2 | 12/2018 | Nagata et al. | | |
| 10,259,317 B2 * | 4/2019 | Shin | .................... | B60B 27/0052 |
| 10,516,315 B2 * | 12/2019 | Furuuchi | ................. | H02K 9/02 |
| 2004/0099455 A1 | 5/2004 | Nagaya | | |
| 2016/0159145 A1 | 6/2016 | Nagata et al. | | |
| 2017/0324297 A1 | 11/2017 | Furuuchi et al. | | |

FOREIGN PATENT DOCUMENTS

| | | |
|---|---|---|
| JP | 2005-333706 | 12/2005 |
| JP | 2007-162923 | 6/2007 |
| JP | 2008-273406 | 11/2008 |
| JP | 2009-136078 | 6/2009 |
| JP | 2013-256254 | 12/2013 |
| JP | 2014-75879 | 4/2014 |
| JP | 2014-237426 | 12/2014 |
| JP | 2016-25789 | 2/2016 |
| JP | 5899009 | 4/2016 |
| WO | WO2016/080494 | 5/2016 |

OTHER PUBLICATIONS

International Search Report dated Nov. 14, 2017 in corresponding International Application No. PCT/JP2017/033546.
Extended European Search Report, dated Mar. 31, 2020, in corresponding European Application No. 17852992.1 (7 pp.).

* cited by examiner

PRIOR ART

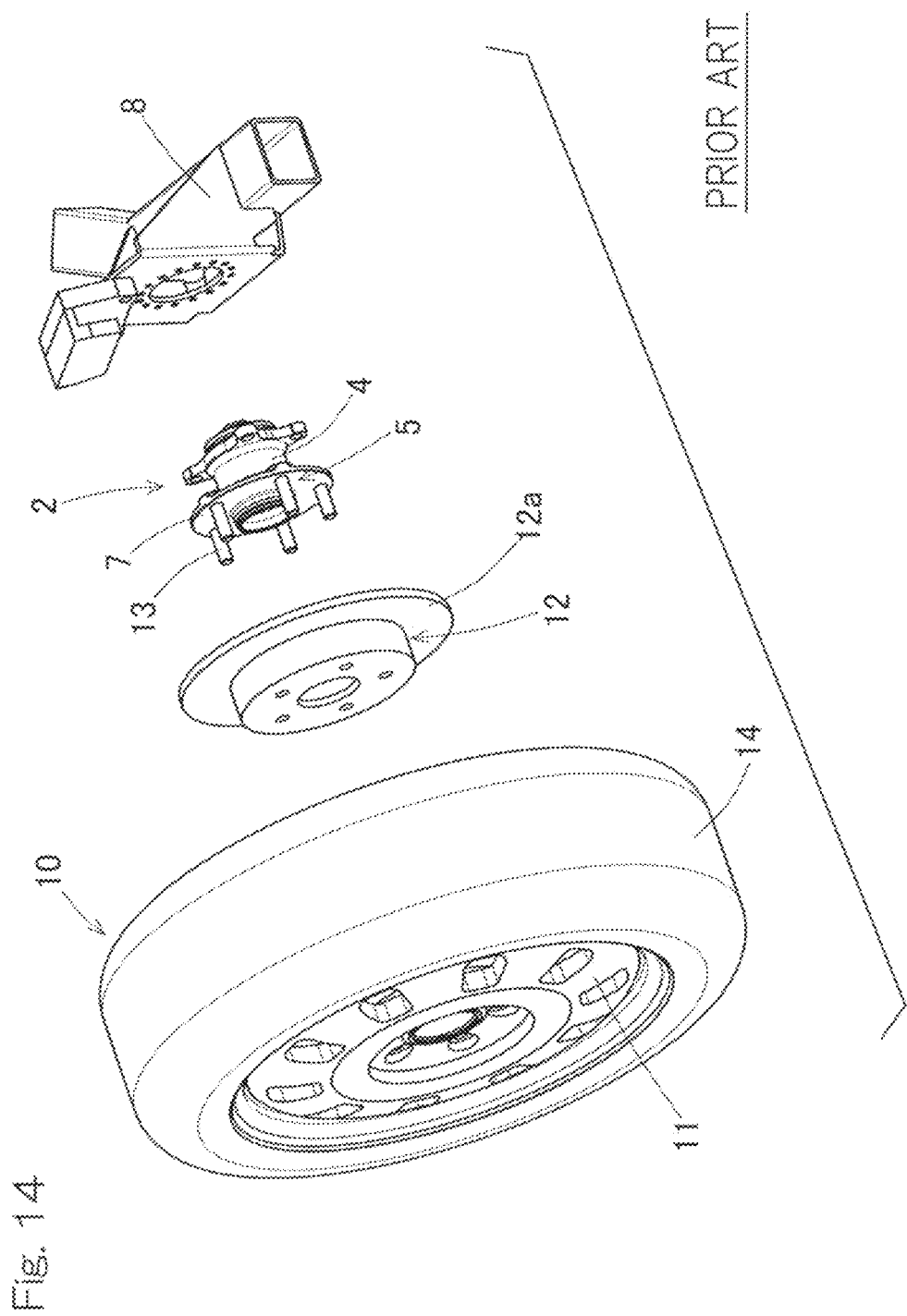

BEARING DEVICE FOR WHEELS WITH AUXILIARY POWER DEVICE

CROSS REFERENCE TO THE RELATED APPLICATION

This application is a continuation application, under 35 U.S.C. § 111(a) of international patent application No. PCT/JP2017/033546, filed Sep. 15, 2017, which claims priority to Japanese patent applications No. 2016-184295, filed Sep. 21, 2016, and No. 2017-169222, filed Sep. 4, 2017, the entire disclosures of which are herein incorporated by reference as a part of this application.

BACKGROUND OF THE INVENTION

Field of the Invention

The present invention relates to an auxiliary power unit equipped wheel support bearing assembly which can be installed to a vehicle, such as a front wheel drive vehicle or a rear wheel drive vehicle, in addition to a main drive source which is either a motor, an internal combustion engine, or a hybrid design that combines these, in order to improve vehicle performances such as traveling performance, braking performance and fuel consumption rate of the vehicle.

Description of Related Art

An in-wheel motor system of a direct drive design has been proposed, in which a motor has: a rotor positioned onto a hub unit via a hollow cylindrical plate; and a stator mounted to a suspension frame component of a vehicle via a cushioning mechanism (for example, Patent Document 1). The rotor of the motor will be positioned spaced apart from and radially outwardly of a brake disc, and the brake disc and the cushioning mechanism will be arranged along an axial direction of the brake disc.

In each in-wheel motor system of a conventional design, an in-wheel motor is used as a main drive source for traction purposes. By the way, the use of a motor—though not an in-wheel motor—as an auxiliary drive source for traction purposes in an engine vehicle has also been proposed. For instance, a vehicle driving system has been proposed, in which a first motor generator is mechanically connected to one of front wheels and rear wheels of a vehicle, and a second motor generator is mechanically connected to the other one of the front wheels and the rear wheels (Patent Document 2). According to this system, the first motor generator, the second motor generator and a battery are electrically connected to each other via a control unit. Thus, mutual exchange of energy is possible among them, thereby allowing for recovery of energy from both of the front wheels and the rear wheels during a braking operation. Therefore, improved energy efficiency can be expected.

For another instance, a system described in Patent Document 3 has been proposed as an auxiliary power system that further improves energy efficiency without requiring complex control. In Patent Document 3, a motor generator is configured to—when installed to a vehicle—be capable of transferring a mechanical power only to and receiving a mechanical power only from rear wheels that are not driven by a main power system. Moreover, a power source unit is configured to supply an electrical drive power only to the motor generator and store a regenerative power only from the motor generator.

FIG. 12 to FIG. 14 illustrate a typical suspension at a driven wheel. In FIGS. 12 to 14, parts corresponding to those shown in FIGS. 1 to 11—which illustrate embodiments of the present invention as will be discussed later—are indicated with the same reference characters as those used in such embodiments. Therefore, the description of these parts is not made here. As shown in FIG. 12, a space S is defined between a wheel support bearing assembly 2 and a brake rotor 12.

RELATED DOCUMENT

Patent Document

[Patent Document 1] JP Laid-Open Patent Publication No. 2005-333706
[Patent Document 2] JP Patent No. 5899009
[Patent Document 3] JP Laid-Open Patent Publication No. 2016-025789

If an in-wheel motor system of a direct drive design as described in Patent Document 1 is used, a brake disc will have to be positioned radially inwardly of an annular-shaped motor. This makes the installation of a brake assembly difficult, because a brake caliper will interfere with the motor. Aside from the one described in Patent Document 1, a variety of different types of in-wheel motor systems of a direct drive design have been proposed. However, none of these configurations makes effective use of the space defined within an inner periphery of a tire or considers how to design a wheel support bearing assembly that is sufficient for the support of a wheel. This makes such an in-wheel motor system less likely for practical use. Though some of the speed reducer-equipped, in-wheel motor systems that have been proposed can be feasible, they are bulky and require a suspension design that is quite different from that used in a typical vehicle.

In the configuration described in Patent Document 2, regenerative powers are generated by the first motor generator and the second motor generator during a braking operation of the vehicle. However, the braking levels of the front and rear regenerative brakes have to be adjusted in order to stabilize the vehicle's posture so that the vehicle does not cause abnormal behavior. Thus, their regenerative powers fluctuate during the braking operation. The use of quite complex control is required to store in a common battery such regenerative powers of varying levels.

In Patent Document 3, a motor generator is configured to be capable of transferring a mechanical power only to and receiving a mechanical power only from driven wheels. Moreover, a power source unit is configured to supply an electrical drive power only to the motor generator and store a regenerative power only from the motor generator. In this way, Patent Document 3 attempts to overcome the above-mentioned drawback.

However, according to the arrangement described in Patent Document 3, the auxiliary power system is configured such that a battery is connected with the motor generator, which motor generator transfers a mechanical power through a clutch, a mechanical power distributing mechanism and a driveshaft to the driven wheels (tires). Therefore, the deployment of the auxiliary power system requires these components to be used and arranged in a configuration similar to that found in a 4-wheel drive vehicle. This results in a complicated structure and an increased vehicle weight.

SUMMARY OF THE INVENTION

An object of the present invention is to provide an auxiliary power unit equipped, wheel support bearing assembly, which provides a simpler and more compact construction without requiring the structures of a typical wheel support bearing assembly and of a typical brake assembly to be significantly modified, which makes effective use of a space that is present radially inwardly of a tire in order to allow the assembly to be entirely accommodated within a wheel, which does not require a significant change of the design of a suspension frame component, and which can be used in combination with a main drive source that is configured for creating traction to perform drive assist, regenerative braking and power generation to improve vehicle performances such as traveling performance, braking performance and fuel consumption rate of a vehicle.

An auxiliary power unit equipped wheel support bearing assembly according to the present invention includes a wheel support bearing assembly which has a stationary ring and a rotational ring, and an auxiliary power unit. The rotational ring has a hub flange to which a wheel of a vehicle and a brake rotor are intended to be mounted, and is rotatably supported via rolling elements by the stationary ring. The auxiliary power unit includes a motor generator. The motor generator includes a stator mounted to the stationary ring and a motor rotor mounted to the rotational ring. An entirety of the auxiliary power unit is sized to extend less than an outer peripheral segment of the brake rotor, with the outer peripheral segment defining an area against which a brake caliper is intended to be pushed. The auxiliary power unit is, with respect to an axial direction, sized to be situated between the hub flange of the wheel support bearing assembly and a mounting face of the wheel support bearing assembly for mounting to a vehicle body of the vehicle.

The main drive source may comprise only an internal combustion engine, or a combination of an internal combustion engine and an electric motor, or—alternatively—only an electric motor.

In such a configuration, the auxiliary power unit that is mounted to the wheel support bearing assembly is of a direct drive design in which the motor rotor is directly fixed to the rotational ring of the wheel support bearing assembly. Therefore, a speed reducer, a clutch, a mechanical power distributing mechanism, a driveshaft, and so forth are not required, thereby providing a simplified structure to transfer an auxiliary mechanical power—thus, achieving space saving—and minimizing the increase of the vehicle weight. Among others, an entirety of the auxiliary power unit that includes the motor generator is sized to extend less than the outer peripheral segment of the brake rotor, and the auxiliary power unit is also sized to be situated within the axial dimension of the wheel support bearing assembly. In this way, the auxiliary power unit can be installed by making effective use of a space available in a typical vehicle between an outer peripheral segment of a brake rotor and a wheel support bearing assembly.

Further, since a brake rotor can be positioned outside of an outer periphery of the auxiliary power unit, a brake caliper that pushes friction pads against the brake rotor does not interfere with the auxiliary power unit. That is, the installation of the auxiliary power unit does not hinder the installation of a brake assembly. As such, the space that is present radially inwardly of a tire and of a rim of a wheel can be exploited effectively for installation of the auxiliary power unit without interfering with the brake assembly.

The space between an outer peripheral segment of a brake rotor and a wheel support bearing assembly has a limited size that is not sufficient for a motor configured as a main drive source to be installed therein. The present invention makes effective use of such a space in order to install a motor by configuring the motor as an auxiliary power unit and by, in addition, employing a direct drive design for the auxiliary power unit. As a result, it is possible, in combination with a main drive source that is configured for creating traction, to perform drive assist, regenerative braking and power generation so as to improve vehicle performances such as traveling performance, braking performance and fuel consumption rate of a vehicle.

For instance, the motor generator can be driven in accordance with the traveling conditions, such as the vehicle speed or running resistance, of the vehicle, in order to provide a regime of rotational speed and torque in which the main drive source can be driven with better efficiency. In this way, traveling performance of the vehicle can be improved. More specifically, the motor generator may perform drive power assisting during acceleration, or may provide an additional drive power or generate an electrical power during constant speed traveling or in cruising state of the vehicle. This allows the main drive source to be driven with better efficiency or recover an appropriate regenerative power. Especially, when the main drive source uses an internal combustion engine (a gasoline engine or a diesel engine), its efficiency greatly varies between different rotational speeds or between different torques. Thus, drive power assisting by the motor generator for improved efficiency of the main drive source may prove to be more beneficial.

In the auxiliary power unit equipped wheel support bearing assembly according to the present invention, the wheel support bearing assembly may be configured to support a driven wheel that is mechanically unconnected to a main drive source of the vehicle. The wheel support bearing assembly can be installed with ease to a driven wheel because, as mentioned above, it provides a simpler and more compact construction without requiring the structures of a typical wheel support bearing assembly and of a typical brake assembly to be significantly modified. Further, by installing the wheel support bearing assembly to a driven wheel, it is possible to operate the auxiliary power unit as a generator and to store, in a battery, a generated, regenerative power—which is energy that is previously converted into heat by a mechanical brake. This allows a braking power to be effected. The additional use or conditional use of a mechanical brake can improve braking performance of the vehicle.

In the auxiliary power unit equipped wheel support bearing assembly according to the present invention, the wheel support bearing assembly may be configured to support a drive wheel that is mechanically connected to a main drive source of the vehicle. The wheel support bearing assembly can also be installed with ease to a drive wheel because, as mentioned above, it provides a simpler and more compact construction without requiring the structures of a typical wheel support bearing assembly and of a typical brake assembly to be significantly modified. By installing the wheel support bearing assembly to a drive wheel, it is possible to operate the auxiliary power unit as a generator and store, in a battery, a generated, regenerative power—which is energy that is previously converted into heat by a mechanical brake. This allows a braking power to be effected. The additional use or conditional use of a mechanical brake can improve braking performance of the vehicle. Normally, the structure required for coupling an auxiliary power unit to a drive wheel is complicated. On the other hand, an auxiliary power unit according to the present invention is of a direct drive design, thereby enabling the auxiliary power unit to be easily applied to a drive wheel.

In the auxiliary power unit equipped wheel support bearing assembly according to the present invention, the stationary ring of the wheel support bearing assembly may be an outer ring, and the rotational ring thereof may be an inner ring. An auxiliary power unit equipped, wheel support bearing assembly according to the present invention can also be designed for applications with outer ring rotation. Nevertheless, applications with inner ring rotation allow more effective use of the available space to install various components.

For applications with inner ring rotation, the auxiliary power unit may include a rotatable casing that is fixed to an outer diameter surface of the hub flange of the inner ring, the motor rotor may be fixed to an inner periphery of the rotatable casing, and the stator may be fixed to an outer periphery of the outer ring. Such a configuration results in an outer rotor design, which is more efficient than an inner rotor design, because a moment acts on a more radially outer location. Further, the rotatable casing, which is designed to be fixed to an outer diameter surface of the hub flange, does not add any extra dimension in an axial direction for fixing the rotatable casing. Therefore, a greater portion of the space that is present outside of an outer periphery of the outer ring can be exploited for installation of the auxiliary power unit.

In such a configuration, a rotation detector configured to detect a rotational speed of the inner ring relative to the outer ring may be associated between an end of the outer ring, which is proximal to the hub flange of the inner ring, and the inner ring. The rotation detector may comprise, for example, a resolver, a Hall sensor, or a photoelectric type or magnetic type sensor. Such an arrangement of the rotation detector can keep compact the axial dimension of the auxiliary power unit equipped, wheel support bearing assembly with the rotation detector.

For applications with inner ring rotation, the auxiliary power unit may include a rotatable casing that is fixed to a lateral face of the hub flange of the inner ring, which is opposite to a mounting face of the hub flange to which the wheel is intended to be mounted, the motor rotor may be fixed to an inner periphery of the rotatable casing, and the stator may be fixed to an outer periphery of the outer ring. Such a configuration also results in a more efficient, outer rotor design. Further, the rotatable casing, which is designed to be associated with the hub flange of the inner ring in an overlapping manner, can increase the rigidity of the flange, thereby improving rotational precision.

In such a configuration, a rotation detector configured to detect a rotational speed of the inner ring relative to the outer ring may be associated between an end of the inner ring, which is opposite to the hub flange of the inner ring, and the outer ring or a suspension frame component to which the outer ring is intended to be secured. Such an arrangement of the rotation detector—although this results in the rotation detector being situated outside of the wheel support bearing assembly in an axial direction—can provide a wider space for installation of the rotation detector.

In the present invention, the stator may have an axial width $\beta$ that is greater than a distance $\alpha$ between centers of a plurality of rows of the rolling elements of the wheel support bearing assembly. With such a configuration where the axial width $\beta$ of the stator is greater than the distance $\alpha$ between the centers of a plurality of rows of the rolling elements (i.e. by configuring $\alpha<\beta$, the surface area where the stator and the motor rotor face each other can be increased without requiring the structures of a typical wheel support bearing assembly and of a typical brake assembly to be significantly modified. This results in a greater output of the auxiliary power unit.

In the present invention, a preload may be applied to the wheel support bearing assembly. By configuring $\alpha<\beta$ as described above, the bearing is more subject to possible misalignment when a moment load about an axial direction acts on an axial end of the motor generator. This may cause tilt or backlash between the wheel support bearing assembly and a tire. However, by applying a preload to the wheel support bearing assembly, the rigidity of the bearing can be increased, thereby minimizing possible misalignment of the bearing when a moment load about an axial direction acts on an axial end of the motor generator. In this way, tilt or backlash between the wheel support bearing assembly and a tire can be prevented.

In the present invention, the stator may have coil ends, connections and wires, all of which are arranged between an inboard end of the hub flange and the outboard mounting face of the wheel support bearing assembly for mounting to the vehicle body of the vehicle. In this case, the coil ends, connections and wires of the stator can be positioned with respect to a pre-existing type of wheel support bearing assembly without requiring a significant change of the design of such a wheel support bearing assembly. Accordingly, it is possible to keep down the manufacturing cost.

Any combinations of at least two features, disclosed in the appended claims and/or the specification and/or the accompanying drawings should be construed as included within the scope of the present invention. In particular, any combinations of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals that indicate parts are used to denote like or corresponding parts throughout different figures, and:

FIG. 14 shows an exploded perspective view of the suspension structure.

DESCRIPTION OF EMBODIMENTS

Figure 1:
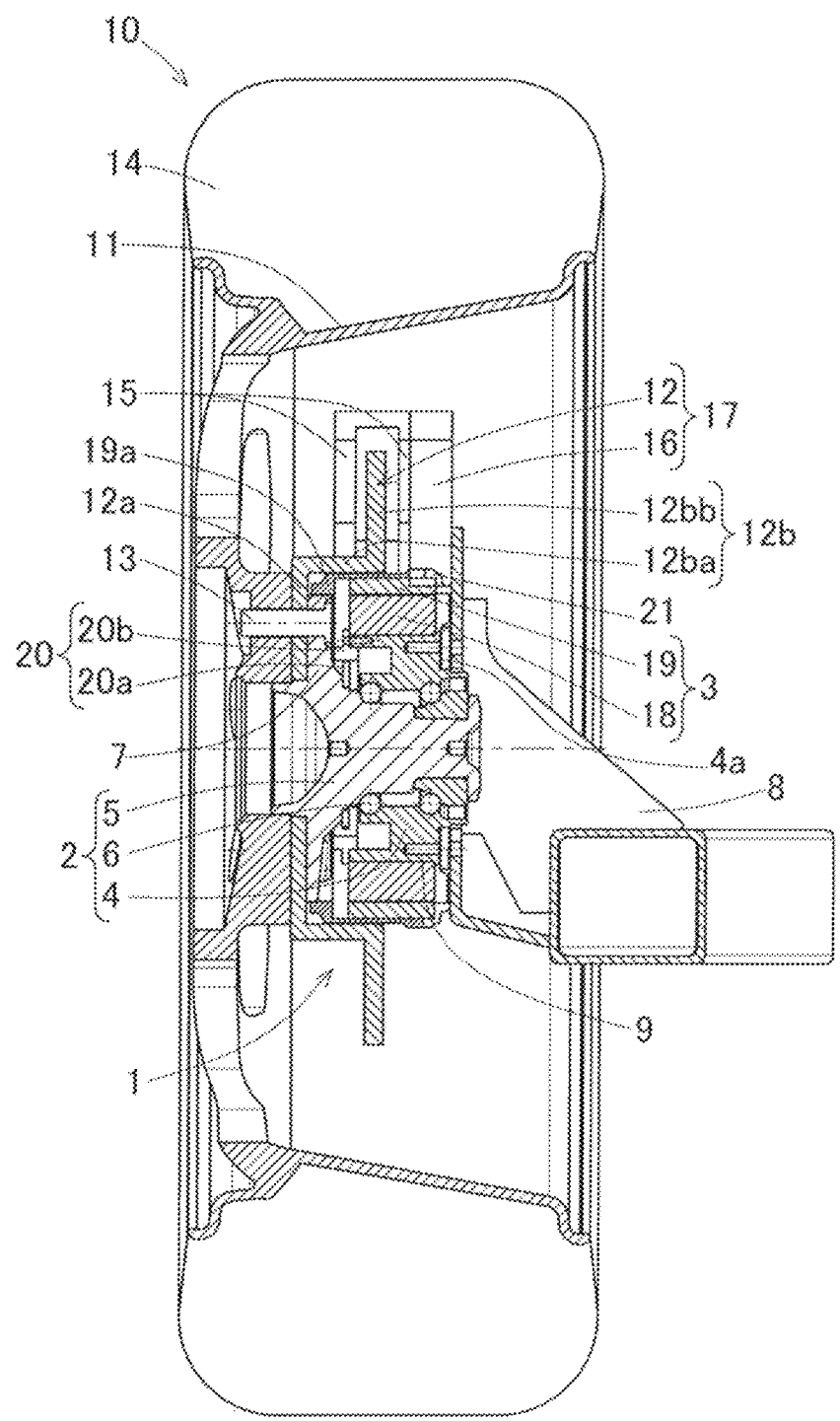
FIG. 1 shows a cross-sectional view of an auxiliary power unit equipped, wheel support bearing assembly, in accordance with a first embodiment of the present invention.

A first embodiment of the present invention will be described in connection with FIG. 1 to FIG. 3. The illustrated auxiliary power unit equipped, wheel support bearing assembly 1 includes a wheel support bearing assembly 2 and an auxiliary power unit 3.

The wheel support bearing assembly 2 includes an outer ring 4 which serves as a stationary ring and an inner ring 5 which serves as a rotational ring. The inner ring 5 is rotatably supported via a plurality of rows of rolling elements 6 by the outer ring 4. The inner ring 5 has a hub flange 7 in an area thereof that projects in an axial direction (on the left side of the sheet of FIG. 1) with respect to the outer ring 4. The outer ring 4 is, at a mounting face 4a for mounting to a vehicle body—on an end of the outer ring 4, which end is opposite to the hub flange 7—mounted with the use of bolts 9 to a suspension frame component 8 such as a knuckle so as to support the weight of the vehicle body. A rim 11 of a wheel 10 and a brake rotor 12 are mounted with the use of hub bolts 13 to a lateral face (a face oriented to the left side in FIG. 1) of the hub flange 7, which face is opposite to the outer ring 4. More specifically, the brake rotor 12 is sandwiched and held between the hub flange 7 and the rim 11. A tire 14 is attached to an outer periphery of the rim 11.

The brake rotor 12 is a disc-shaped design that has a flat plate segment 12a that overlaps with the hub flange 7 and an outer peripheral segment 12b that extends from the flat plate segment 12a in a direction further outside of an outer periphery of the outer ring 4. The outer peripheral segment 12b includes a cylindrical portion 12ba and a radially outer, flat plate portion 12bb that extends in a radially outer direction from a terminating end of the cylindrical portion 12ba. A brake assembly 17 includes the brake rotor 12 and a brake caliper 16. The brake caliper 16 includes friction pads 15 that clamp the brake rotor 12. The brake caliper 16 is mounted to the suspension frame component 8. The brake caliper 16 may be a hydraulic type or a mechanical type, or may be actuated by an electric motor.

The auxiliary power unit 3 includes a motor generator. The auxiliary power unit 3 includes a stator 18 mounted to an outer peripheral surface of the outer ring 4 and a motor rotor 19 mounted to the hub flange 7 of the inner ring 5. The auxiliary power unit 3 in the embodiment under discussion comprises a synchronous motor—in particular, an IPM synchronous motor of an outer rotor design. Alternatively, the auxiliary power unit 3 may comprise an SPM synchronous motor. Moreover, a variety of different types such as a switched reluctance motor (SRM) and an induction motor (IM) can be used. For a synchronous motor, a variety of different types of stator windings can be used such as distributed winding or concentrated winding. The auxiliary power unit 3 may be of an inner rotor design. Nevertheless, in order for a larger torque to be produced within a limited space, an outer rotor design is preferred since a moment acts on a more radially outer location.

Figure 3:
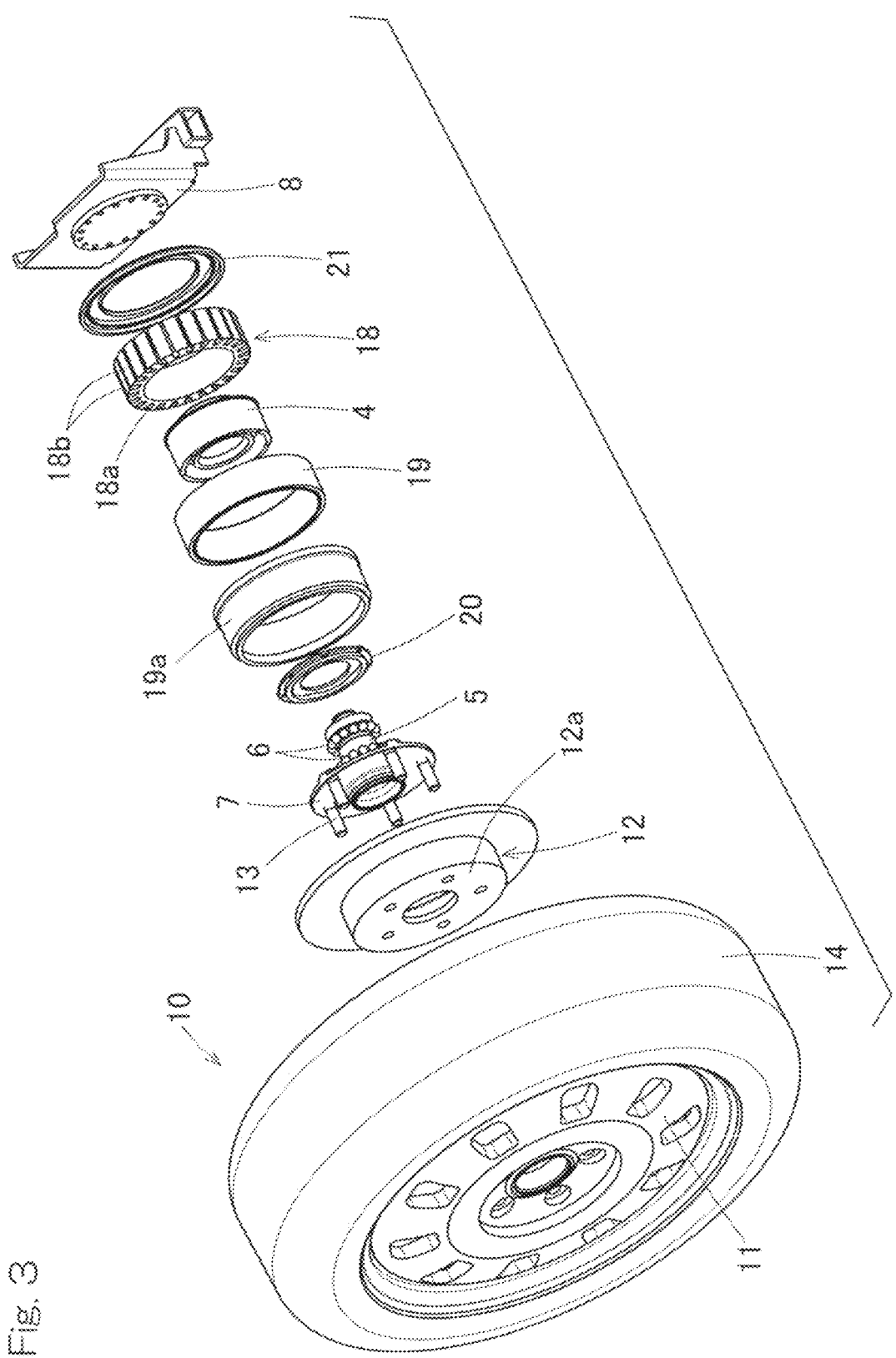
FIG. 3 shows an exploded perspective view of the auxiliary power unit equipped, wheel support bearing assembly.

The stator 18 of the auxiliary power unit 3 in the embodiment under discussion includes a core 18a and coils 18b (FIG. 3). The motor rotor 19 is mounted to an inner periphery of a rotatable casing 19a that serves as a motor casing. The motor rotor 19 can be mounted to the hub flange 7 by mounting the rotatable casing 19a to the hub flange 7. In the embodiment under discussion, the rotatable casing 19a is mounted to an outer peripheral surface of the hub flange 7 as shown in FIG. 1. The rotatable casing 19a is fixed to the hub flange 7 by, for example, being fitted, welded or bonded thereto.

The motor rotor 19 in the embodiment under discussion includes permanent magnets. Alternatively, the motor rotor 19 may be formed of permanent magnets and a magnetic material. The rotatable casing 19a is, at one of ends thereof, closed by a motor shield 21. The motor shield 21 blocks possible intrusion of foreign objects into an interior of the auxiliary power unit 3 from a side proximal to the suspension frame component 8 including a knuckle. The motor shield 21 is mounted to the casing 19a.

With respect to a radial direction, an entirety of the auxiliary power unit 3 is sized to extend less than the outer peripheral segment 12b of the brake rotor 12. On the other hand, with respect to an axial direction, the auxiliary power unit 3 is sized to be situated between the hub flange 7 of the wheel support bearing assembly 2 and the mounting face 4a of the wheel support bearing assembly 2 for mounting to the vehicle body. That is, the auxiliary power unit 3 is sized to be accommodated between the outer peripheral segment 12b of the brake rotor 12 and the area defining an outer periphery of the outer ring 4 of the wheel support bearing assembly 1. It should be noted that, with respect to an axial direction, the auxiliary power unit 3 is sized to be partially accommodated within the cylindrical portion 12ba of the outer peripheral segment 12b of the brake rotor 12.

The auxiliary power unit equipped, wheel support bearing assembly in the embodiment under discussion further includes a rotation detector 20. The rotation detector 20 is configured to detect a rotational speed of the inner ring 5 relative to the outer ring 4. This rotational speed can be used to control rotations of the auxiliary power unit 3 including the motor generator. In the embodiment under discussion, the rotation detector 20 is associated between an end (an end on the left side in FIG. 1) of the outer ring 4, which end is proximal to the hub flange 7, and the inner ring 5. The rotation detector 20 includes a detection target component 20a mounted to the inner ring 5 and a sensor component 20b mounted to the outer ring 4. The sensor component 20b detects the detection target component 20a. The rotation detector 20 may comprise, for example, a resolver, a Hall sensor, a photoelectric type sensor, a magnetic type sensor or a combination thereof.

Figure 12:
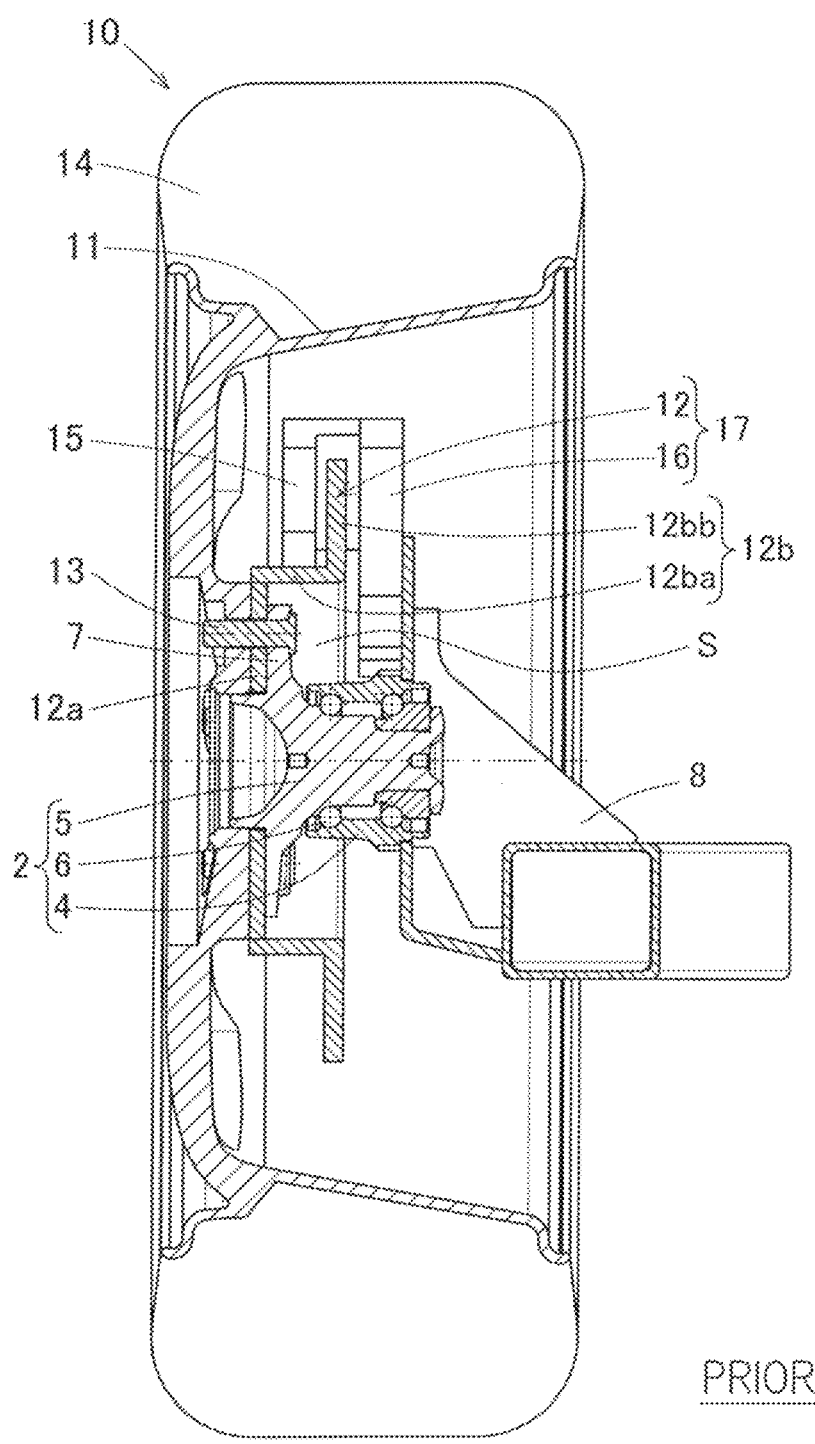
FIG. 12 shows a cross-sectional view of a conventional wheel support bearing assembly as well as of a suspension structure in the vicinity of the assembly.
Figure 13:
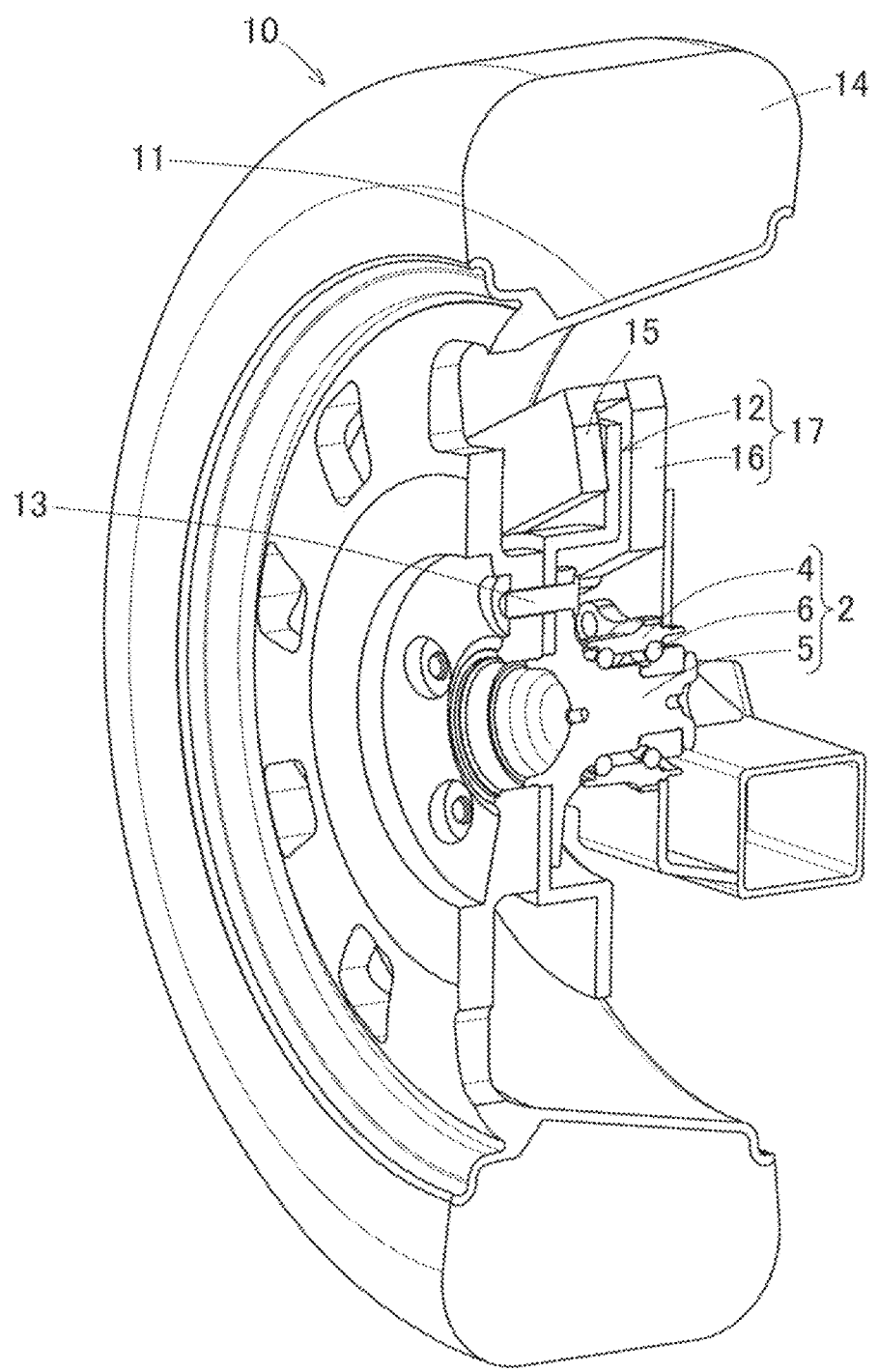
FIG. 13 shows a cut-away perspective view of the suspension structure.

In such a configuration of the auxiliary power unit equipped, wheel support bearing assembly, the auxiliary power unit 3 that is mounted to the wheel support bearing assembly 2 is of a direct drive design in which the motor rotor 19 of the auxiliary power unit 3 is directly fixed to the outer ring 4—that serves as a rotational ring—of the wheel support bearing assembly 2. Therefore, a speed reducer, a clutch, a mechanical power distributing mechanism, a driveshaft, and so forth are not required. Thus, it provides a simplified structure to transfer a mechanical power, thereby achieving space saving and minimizing the increase of the vehicle weight. Among others, an entirety of the auxiliary power unit 3 that includes a motor generator is sized to extend less than the outer peripheral segment 12b of the brake rotor 12, and the auxiliary power unit 3 is also sized to be situated within the axial dimension of the wheel support bearing assembly 2. In this way, the auxiliary power unit 3 can be installed by making effective use of a space S available in a typical vehicle—which is shown in, for example, FIGS. 12 to 14—between an outer peripheral segment of a brake rotor and a wheel support bearing assembly.

Figure 2:
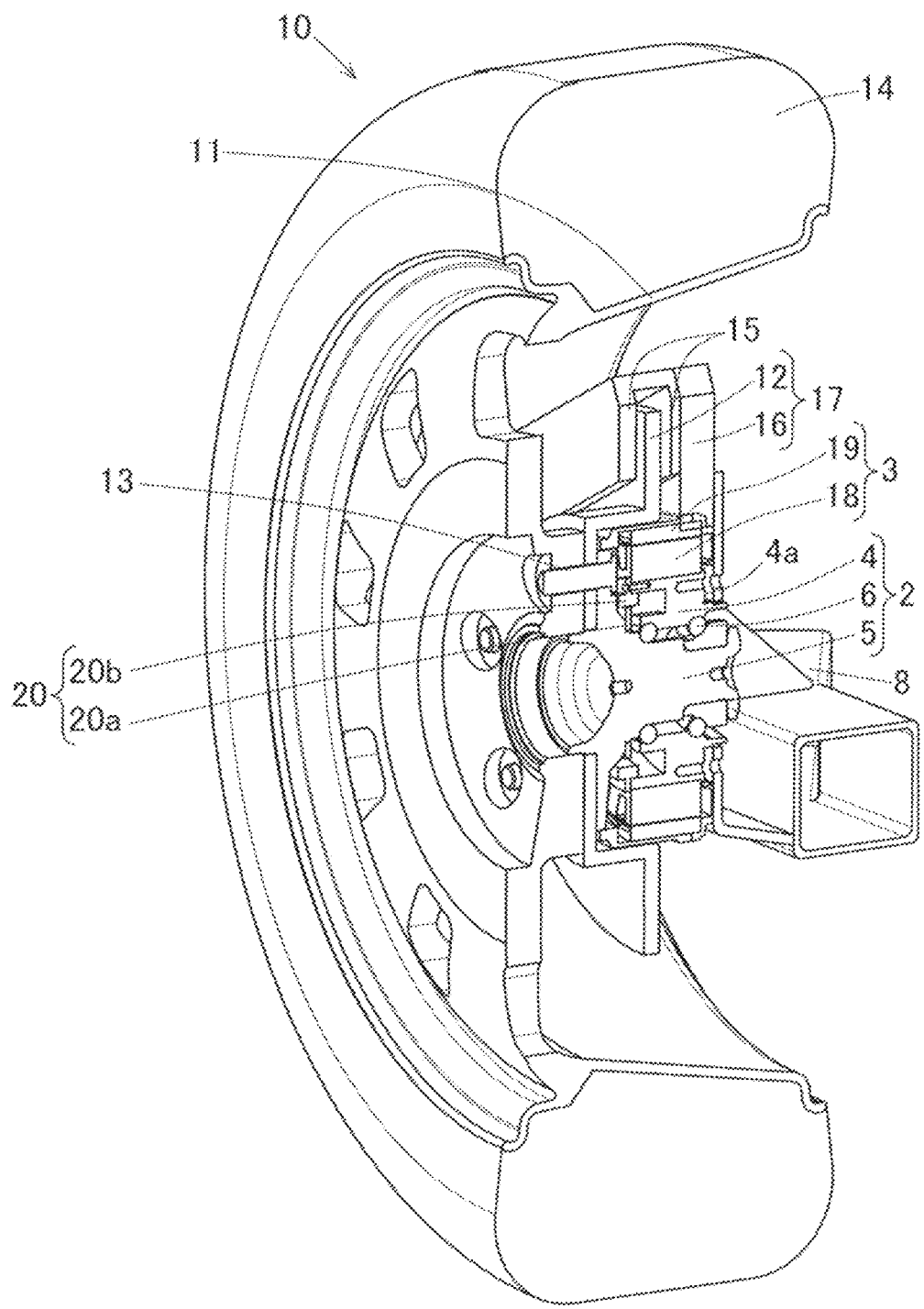
FIG. 2 shows a cut-away perspective view of the auxiliary power unit equipped, wheel support bearing assembly.

Since the brake rotor 12 is positioned outside of an outer periphery of the auxiliary power unit 3 as shown in FIG. 1, the brake rotor 12 and the brake caliper 16 do not interfere with the auxiliary power unit 3. That is, the installation of the auxiliary power unit 3 does not hinder the installation of the brake assembly 17. As such, the space that is present radially inwardly of the tire 14 and of the rim 11 of the wheel 10 can be exploited effectively for installation of the auxiliary power unit 3 without interfering with the brake assembly 17.

The space between the outer peripheral segment 12b of the brake rotor 12 and the wheel support bearing assembly 2 has a limited size that is not sufficient for a motor configured as a main drive source to be installed therein. Yet, the embodiment under discussion makes effective use of such a space in order to install a motor by configuring the installed motor as an auxiliary power unit 3 and by, in addition, employing a direct drive design for the auxiliary power unit 3. In this way, it is possible, in combination with a main drive source that is configured for creating traction, to perform drive assist, regenerative braking and power generation so as to improve vehicle performances such as traveling performance, braking performance and fuel consumption rate of the vehicle.

For instance, the motor generator can be driven in accordance with the traveling conditions, such as the vehicle speed or running resistance, of the vehicle, in order to provide a regime of rotational speed and torque in which the main drive source can be driven with better efficiency. As a result, traveling performance of the vehicle can be improved. More specifically, the motor generator may perform drive power assisting during acceleration, or may provide an additional drive power or generate an electrical power during constant speed traveling or in cruising state of the vehicle. This allows the main drive source to be driven with better efficiency or recover an appropriate regenerative power. Especially, when the main drive source uses an internal combustion engine (a gasoline engine or a diesel engine), its efficiency greatly varies between different rotational speeds or between different torques. Thus, drive power assisting by the motor generator for improved efficiency of the main drive source may prove to be more beneficial.

Other embodiments will be described as follows:

In the discussions that follow, the previous reference characters will be used to denote parts corresponding to features that have already been described in the preceding embodiments, and therefore the description of those parts will not be repeated. Where reference is only made to partial features of a single configuration, the remaining features of the same configuration should be considered as equivalent to those features that have already been described in the preceding embodiments, unless noted otherwise. Identical configurations produce identical advantageous effects. In addition to combinations of parts that are particularly described in different embodiments, the embodiments themselves can also be partially combined together, unless such combinations render the device inoperable.

Figure 4:
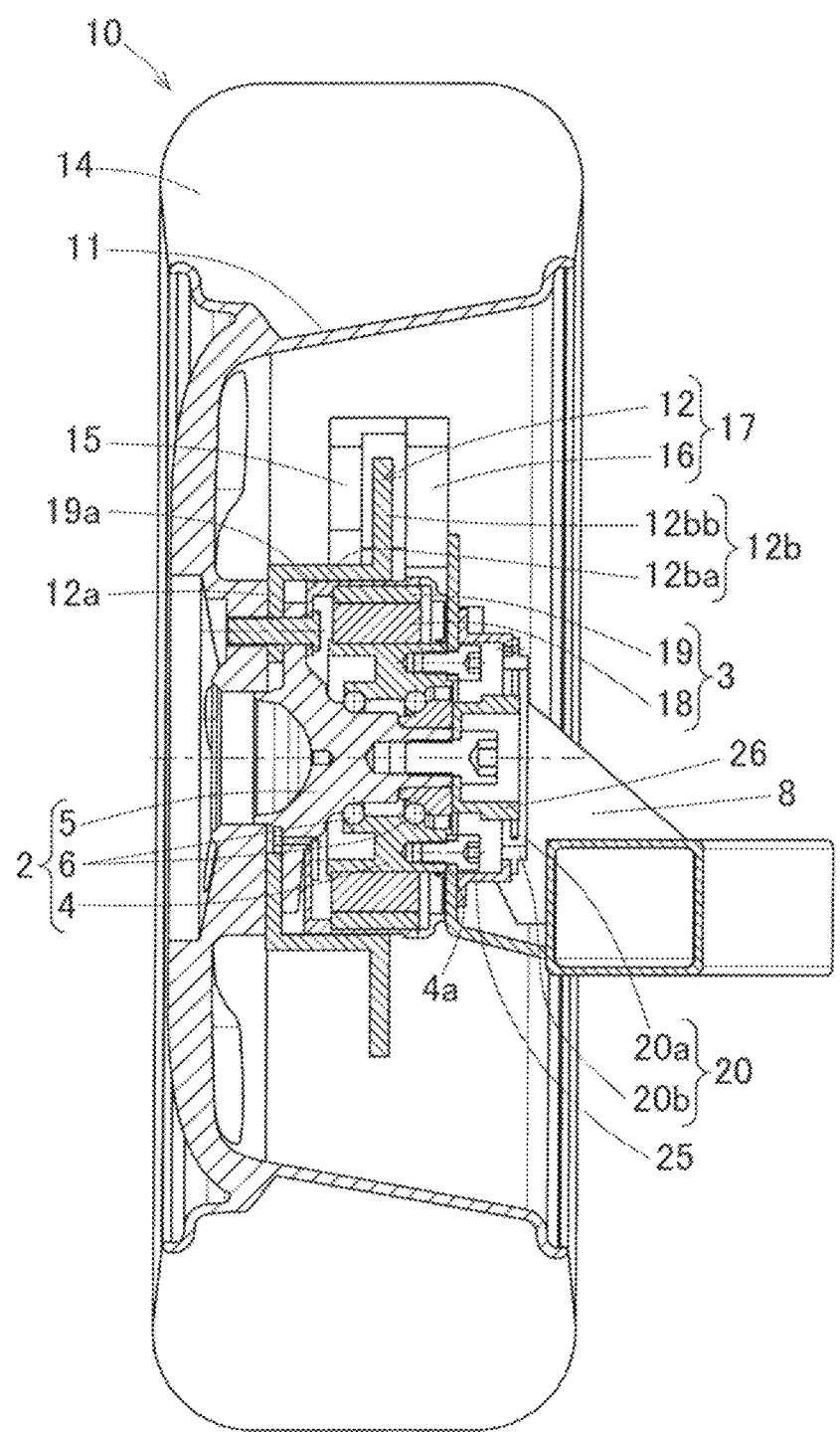
FIG. 4 shows a cross-sectional view of an auxiliary power unit equipped, wheel support bearing assembly, in accordance with a second embodiment of the present invention.
Figure 5:
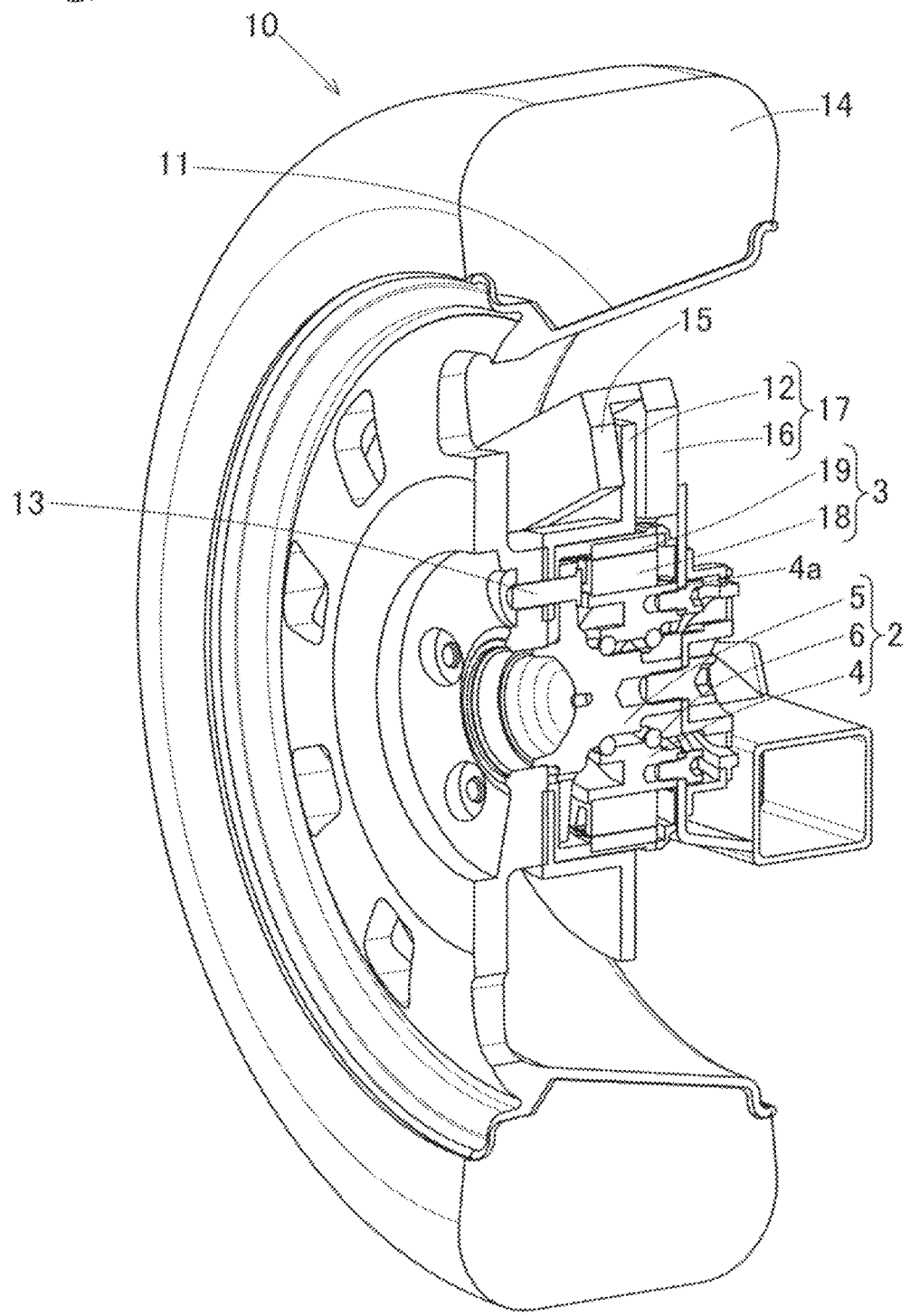
FIG. 5 shows a cut-away perspective view of the auxiliary power unit equipped, wheel support bearing assembly.
Figure 6:
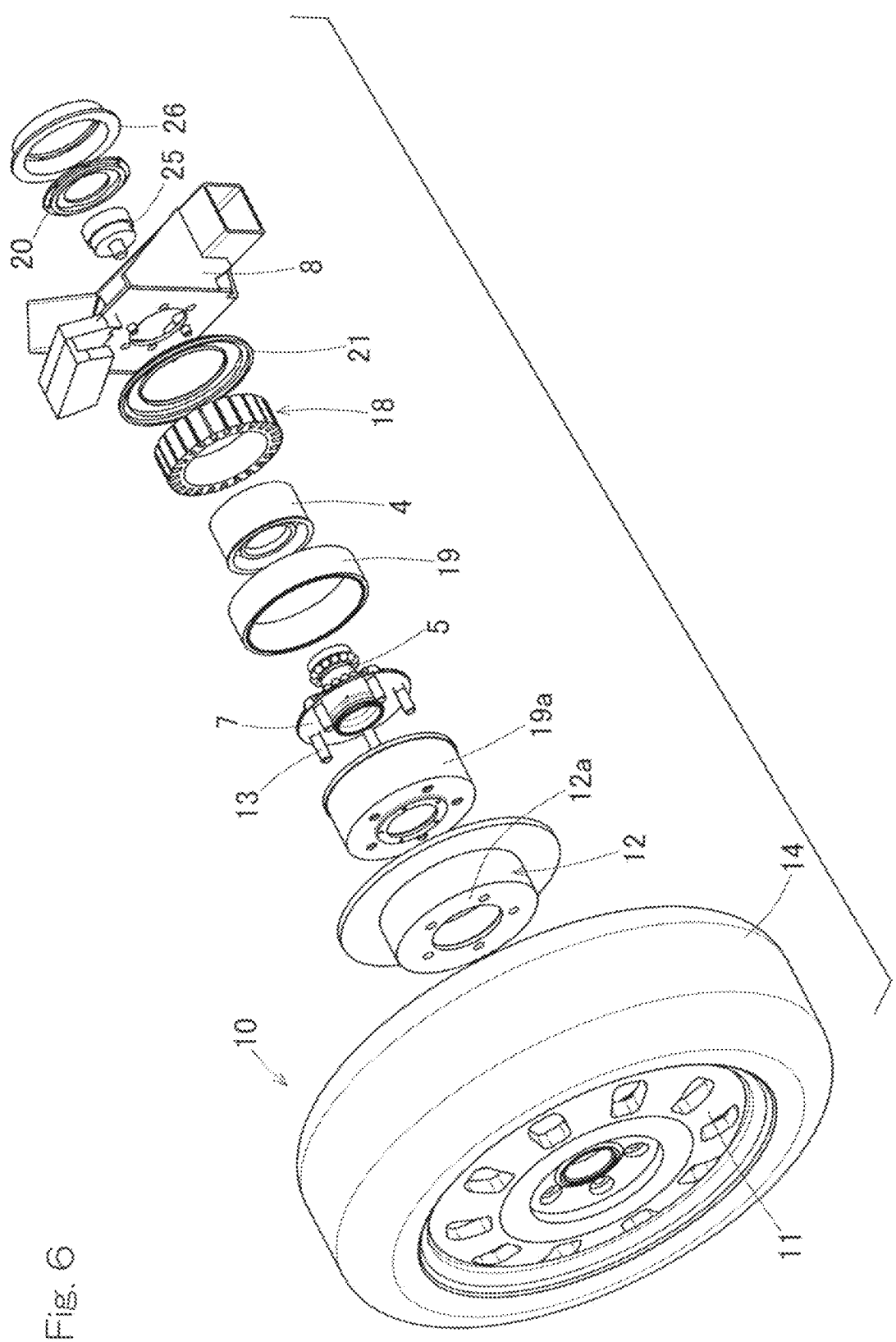
FIG. 6 shows an exploded perspective view of the auxiliary power unit equipped, wheel support bearing assembly.
Figure 11:
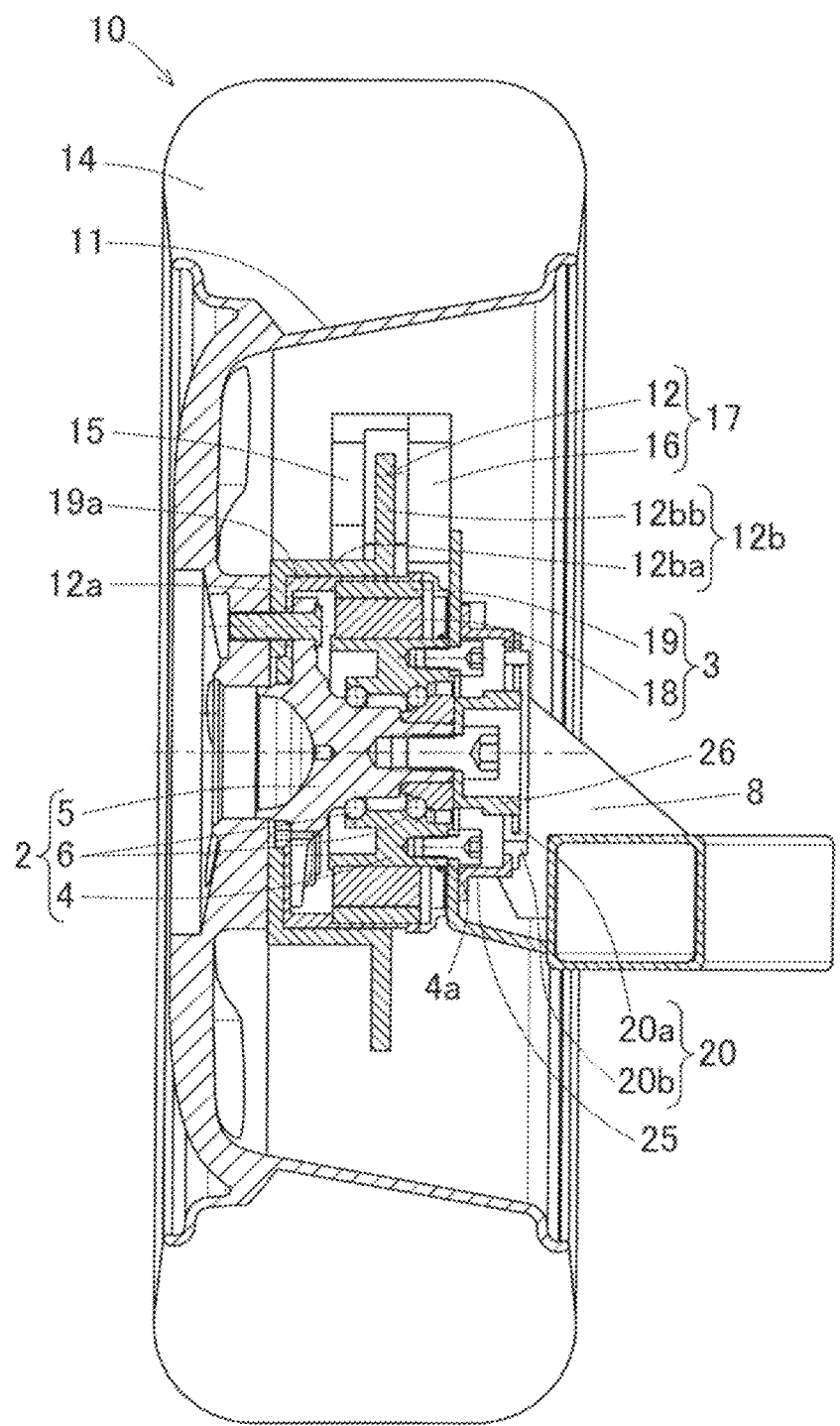
FIG. 11 shows a cross-sectional view of an auxiliary power unit equipped, wheel support bearing assembly, in accordance with an alternative embodiment of the present invention.

FIG. 4 to FIG. 6 illustrate a second embodiment of the present invention. Features of the second embodiment that will not be particularly described below are equivalent to those features that have been described with reference to the first embodiment shown in FIGS. 1 to 3. In the second embodiment, the rotatable casing 19a is mounted to a lateral face of the hub flange 7 of the inner ring, which face is opposite to a mounting face of the hub flange 7 to which the rim 11 is intended to be mounted. The motor rotor 19 is fixed to an inner periphery of the rotatable casing 19a. The rotatable housing 19a is mounted to a lateral face of the hub flange 7 so as to overlap therewith. This can increase the rigidity of the motor rotor 19 and of the hub flange 7, thereby improving rotational precision. It should be noted that the rotatable casing 19a may be mounted to a lateral face of the hub flange 7 of the inner ring, which face also serves as the mounting face of the hub flange 7 to which the rim 11 is intended to be mounted, as shown in an alternative embodiment of FIG. 11.

Moreover, in the second embodiment shown in FIG. 4, the rotation detector 20 configured to detect a rotational speed is associated between an end of the inner ring 5, which end is opposite to the hub flange 7 of the inner ring 5, and the suspension frame component 8. As in the first embodiment, a resolver or a sensor of a different design can be used as the rotation detector 20. The rotation detector 20 includes a detection target component 20a and a sensor component 20b that detects the detection target component 20a. These detection target component 20a and sensor component 20b are mounted to the suspension frame component 8 via a rotational, detector support component 26 and a stationary, detector support component 25, respectively.

Figure 7:
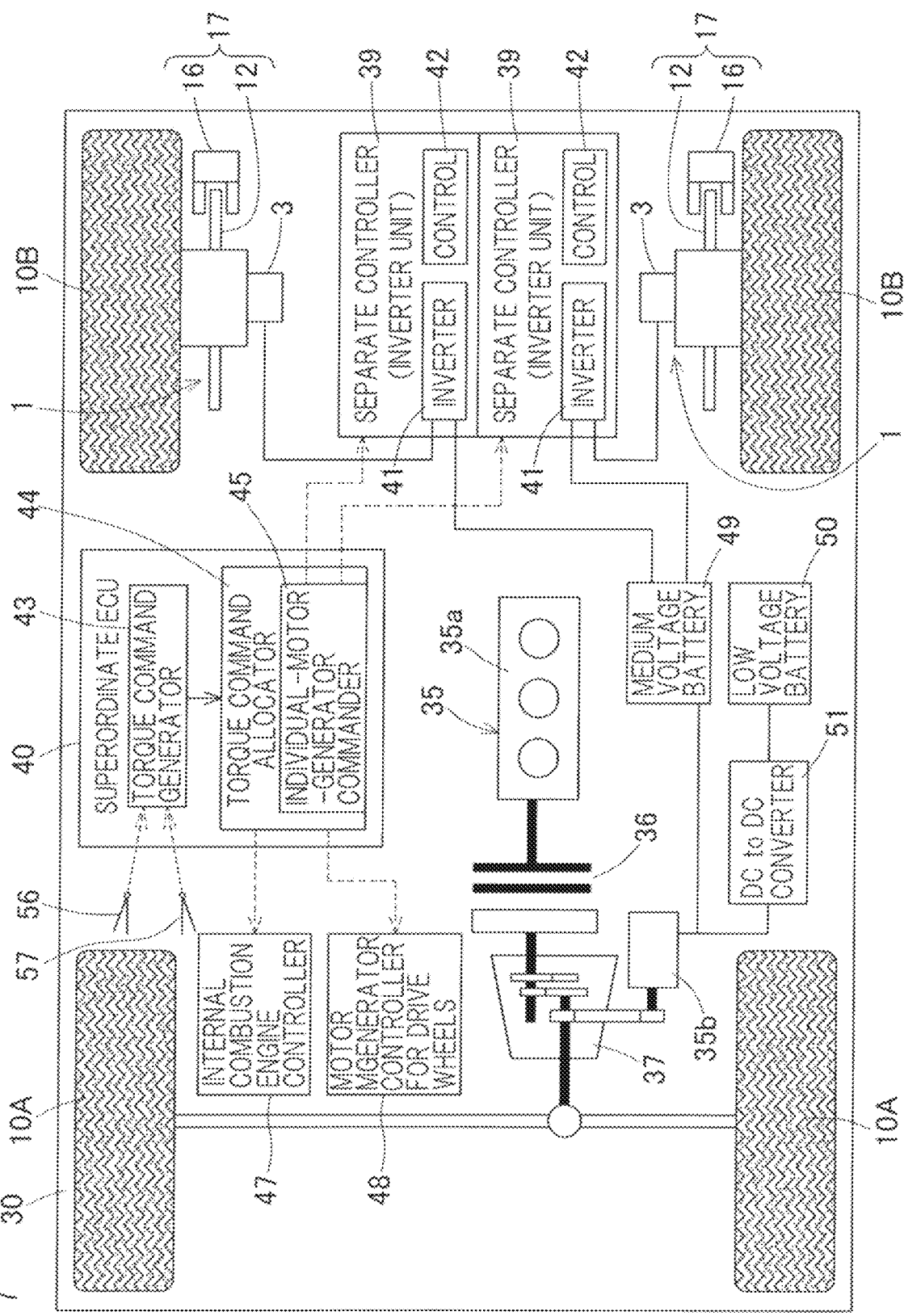
FIG. 7 is a block diagram depicting the concept configuration of a vehicle power assist system that uses the auxiliary power unit equipped, wheel support bearing assembly.
Figure 8:
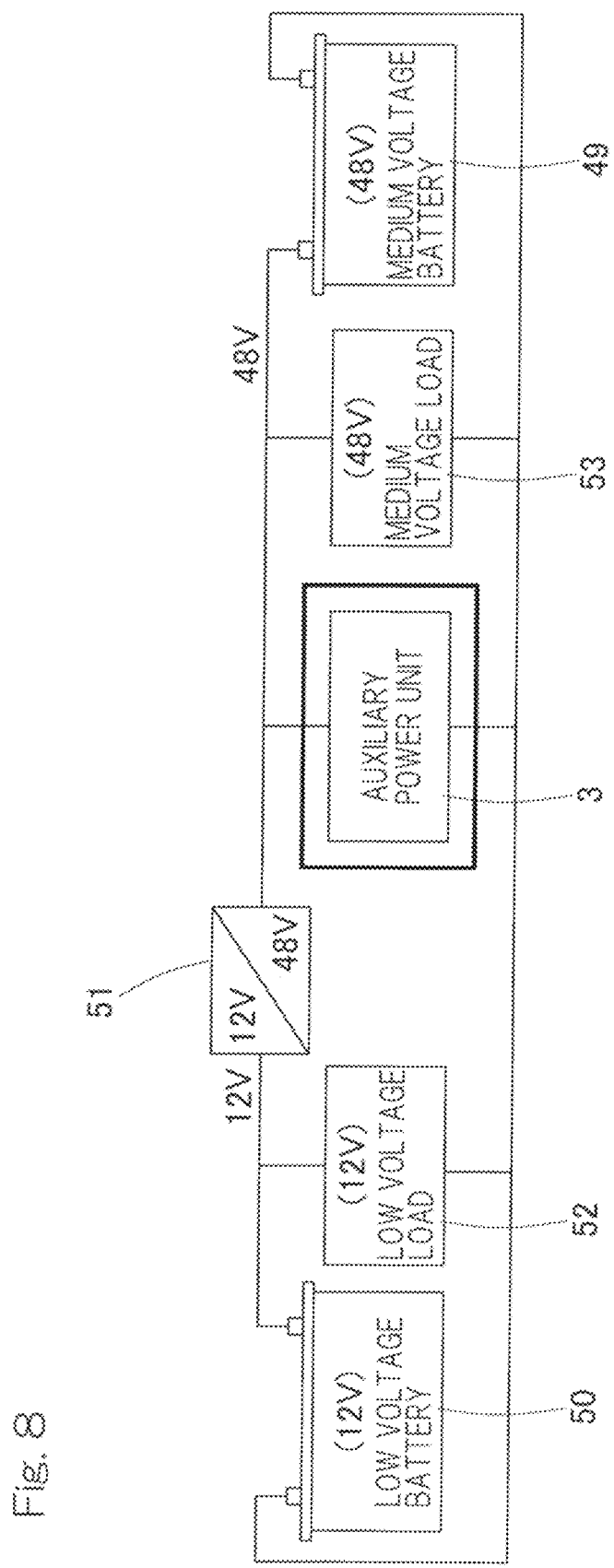
FIG. 8 is an example power supply system diagram for a vehicle with the vehicle power assist system deployed thereto.

FIG. 7 and FIG. 8 are block diagrams depicting the concept configuration of a vehicle power assist system that uses an auxiliary power unit equipped, wheel support bearing assembly 1 according to the first or second embodiment.

A vehicle 30 shown in FIG. 7 is a front wheel drive vehicle in which front wheels are drive wheels 10A and rear wheels are driven wheels 10B. A main drive source 35 is mechanically connected to the drive wheels 10A. On the other hand, the driven wheels 10B and the main drive source 35 are mechanically unconnected. In the illustrated vehicle power assist system, auxiliary power unit equipped, wheel support bearing assemblies 1 are installed to the driven wheels 10B. The main drive source 35 is an internal combustion engine such as a gasoline engine or a diesel engine, a motor generator (electric motor), or a hybrid design drive source that combines both. It should be noted that the term "motor generator" used herein refers to an electric motor to which rotations can be applied to generate an electrical power.

The vehicle 30 shown in FIG. 7 is a hybrid electric vehicle (which, hereinafter, may be referred to as "HEV") in which the main drive source 35 includes an internal combustion engine 35a and a motor generator 35b for the drive wheels. More specifically, it is of a mild hybrid design in which the motor generator 35b for the drive wheels is powered with a medium voltage of, for example, 48V. Hybrids are roughly categorized into strong hybrids and mild hybrids. A "mild hybrid" refers to a design in which an internal combustion engine is used as a primary drive source and in which a motor is mostly used to perform drive assist at the time of starting or acceleration, etc. A "mild hybrid" can be distinguished from a "strong hybrid" in that, in EV (Electric Vehicle) mode, the mild hybrid can carry out a regular travel for only a short period of time and not for an extended period of time. The internal combustion engine 35a shown in FIG. 7 is operatively coupled through a clutch 36 and a speed reducer 37 to a driveshaft for the drive wheels 10A, and the motor generator 35b for the drive wheels is operatively coupled to the speed reducer 37.

The vehicle power assist system includes auxiliary power units 3, separate controllers 39, a superordinate ECU 40 and an individual-units commander 45. The auxiliary power units 3 are drive assist, power units that drive the driven wheels 10B into rotation. The separate controllers 39 are used for controlling the auxiliary power units 3. The individual-units commander 45, which is provided in the superordinate ECU 40, outputs to the separate controllers 39 commands that cause the separate controllers 39 to perform driving operation control and regenerative operation control. The auxiliary power units 3 are connected to a power storage unit. The power storage unit can be used with no particular limits on its designs and its installing locations on the vehicle 30; for example, the power storage unit can comprise a battery (rechargeable battery) or a capacitor. In FIG. 7, the power storage unit is—among a low voltage battery 50 and a medium voltage battery 49 that are installed to the vehicle 30—the medium voltage battery 49.

The auxiliary power units 3 for the driven wheels, which are configured according to one of the first embodiment shown in FIG. 1 and the second embodiment shown in FIG. 4, are direct drive motors without transmissions as described. The auxiliary power units 3 function as motors by receiving power supply and also function as generators by converting the kinetic energy of the vehicle 30 into an electrical power.

The motor rotor 19 of such an auxiliary power unit 3 is mounted to the inner ring 5 that serves as a hub unit. Thus, application of electrical currents to the auxiliary power unit 3 drives the inner ring 5 into rotation, while, on the other hand, induction of voltages during power regeneration allows for recovery of regenerative power.

Referring to FIG. 7, the control system of the vehicle 30 will be described. The superordinate ECU 40 performs supervisory control of the vehicle 30. In the superordinate ECU 40, a command generator 43 is provided. The command generator 43 generates torque commands according to signals that are input from an accelerator operation unit 56 such as an accelerator pedal and from a brake operation unit 57 such as a brake pedal—signals inductive of the amount of operation by the accelerator operation unit 56 and of the amount of operation by the brake operation unit 57, respectively.

The vehicle 30 includes, as a main drive source 35, an internal combustion engine 35a and a motor generator 35b for drive wheels, and also includes two auxiliary power units 3 and 3 for driving two driven wheels 10B and 10B. For this reason, a command allocator 44 is provided in the superordinate ECU 40, which allocator 44 allocates the torque commands among the respective drive sources 35a, 35b, 3 and 3 according to a defined rule. Torque commands for the internal combustion engine 35a are sent to an internal combustion engine controller 47 and used by the internal combustion engine controller 47 for control of, for example, valve opening.

Torque commands for the generator motor 35b for the drive wheels are sent to a controller 48 for the drive wheels, for execution. Torque commands for the auxiliary power units 3 and 3 for the driven wheels are sent to the separate controllers 39 and 39. The command allocator 44 includes an individual-units commander 45 that feeds into the separate controllers 39 and 39. The individual-units commander 45 has functionality for providing to the separate controllers 39, according to the signal indicative of the amount of operation by the brake operation unit 57, torque commands which indicate braking powers that are assigned to the respective auxiliary power units 3 and that should be effected by regenerative braking of the respective auxiliary power units 3.

The separate controllers 39 are inverter units. Such a separate controller 39 includes an inverter 41 and a control 42. The inverter 41 converts a DC power from the medium voltage battery 49 into a 3-phase AC voltage. The control 42 controls an output that the inverter 41 produces by, for example, PWM control on the basis of the torque commands. The inverter 41 includes a bridge circuit (not shown) that is formed of semiconductor switching elements and also includes a charge circuit (not shown) for charging the medium voltage battery 49 with a regenerative power from the associated one of the auxiliary power units 3. Note that, although the separate controllers 39 in FIG. 7 are separately provided for each of the two auxiliary power units 3 and 3, the separate controllers 39 and 39 may be integrated in a single unit having a single control 42 that is shared by both.

FIG. 8 is an electrical connection diagram of a power supply system for a hybrid vehicle shown in FIG. 7. In the example of FIG. 8, the low voltage battery 50 and the medium voltage battery 49 are provided as a battery system. The medium voltage battery 49 is connected to the motor generator 35b. The low voltage battery 50 is connected to the motor generator 35b via a DC to DC converter 51. Although two auxiliary power units 3 exist, a single, representative auxiliary power unit 3 is shown in FIG. 8 for purpose of illustration. Also, although the motor generator 35b for the drive wheels shown in FIG. 7 has been omitted from FIG. 8, the motor generator 35b is, in reality, connected to a medium power system in parallel with the auxiliary power units 3 for the driven wheels. Low voltage loads 52 are connected to a low voltage system, and medium voltage loads 53 are connected to the medium voltage system. A single, representative low voltage load 52 and a single, representative medium voltage load 53 are shown in FIG. 8 for purpose of illustration, although there are, in reality, a plurality of the low voltage loads 52 and medium voltage loads 53.

The low voltage battery 50 is a battery that is generally used in vehicles as a power source for a control system and others and is, for example, 12V or 24V. The low voltage loads 52 include basic components such as a starter motor for the internal combustion engine 35a, lamps, the superordinate ECU 40 and other ECUs (not shown). The low voltage battery 50 serves as an auxiliary battery for electric auxiliary components, whereas the medium voltage battery 49 serves as an auxiliary battery for a motor system.

The medium voltage battery 49 has a higher voltage than that of the low voltage battery 50, but the medium voltage battery 49 has a lower voltage than that of a high voltage battery (100V or more; for example, about 200 to 400V) that is used in strong hybrid vehicles. A 48V battery that is used in mild hybrids is suitable as the medium voltage battery 49. The medium voltage battery 49 such as a 48V battery can be installed in a relatively simple fashion to a traditional vehicle having an internal combustion engine. The medium voltage battery 49 can be used in a mild hybrid to perform electric power assist or a regenerative operation so as to reduce fuel consumption.

The medium voltage loads 53 in such a 48V system include accessory components such as, for example, a power assist motor which is formed by an auxiliary power unit 3 for the drive wheels, an electric pump, an electric power steering system, a supercharger and an air compressor. By configuring the loads consisting of such accessories in the 48V system—although this may result in reduced power assist outputs as compared to those using a higher voltage (e.g. a strong hybrid vehicle with 100V or more)—thinner insulating sheaths can be used for wires, thereby reducing the weights and the bulks of the wires. Furthermore, as compared to 12V, higher power levels can be input or output with smaller current levels, thereby allowing for the use of a more compact motor or generator. These factors contribute to the effect of reducing fuel consumption of the vehicle.

The vehicle power assist system is suitable for accessory components of a mild hybrid vehicle, in which they may be used as components for power assist or power regeneration. It should be noted that a CMG, a GMG and a belt driven starter motor, etc. (none of these configurations is shown), which may be used in a mild hybrid vehicle, are all sensitive to the efficiency of a transmission or a speed reducer, etc. because they act on an internal combustion engine or a power unit to perform power assist or a regenerative operation. In contrast, the vehicle power assist system shown in FIG. 7 is deployed to act on the driven wheels 10B and not to engage a main drive source such as an internal combustion engine 35a or an electric motor (not shown). For power regeneration, the kinetic energy of the vehicle body can be directly exploited.

Furthermore, to incorporate a CMG, a GMG or a belt driven starter motor, etc., the incorporation thereof must be taken into account during a design stage of the vehicle 30. As such, it is challenging to retrofit it to the vehicle 30 at a later time. In contrast, the auxiliary power unit 3 in the vehicle power assist system shown in FIG. 7 can be accommodated in a driven wheel 10B, thereby allowing it to be retrofit to a finished vehicle in the similar number of steps to that required for a regular parts replacement operation. In this way, the 48V system can also be configured in a finished vehicle that only has an internal combustion engine 35a. Moreover, another motor generator 35b for auxiliary driving purpose can also be installed in a vehicle deployed with the vehicle power assist system, as is shown in the example of FIG. 7. In this way, the magnitudes of power assist and power regeneration for the vehicle 30 can be increased, thereby further contributing to reducing fuel consumption.

The operations and the advantageous effects of the vehicle power assist system 1 of the aforementioned configuration are sorted and summarized as follows:

(1) Braking

The auxiliary power unit 3 can be operated as a generator to store in the medium voltage battery 49 a generated power—which is energy that is previously converted into heat by a mechanical brake. This allows a braking power to be effected while recovering energy that is previously discarded.

(2) Acceleration and Steady Running

For a vehicle 30 that includes an internal combustion engine (engine) 35a as a main drive source 35, the auxiliary power unit 3 can be driven in accordance with the traveling conditions (e.g. the vehicle speed or running resistance) of the vehicle 30, in order to provide a regime of rotational speed and torque in which the engine can be run with better efficiency. In this way, the efficiency of the engine can be improved, thereby contributing to improved fuel economy. For instance, the auxiliary power unit 3 may perform drive power assisting during acceleration, or may provide an additional drive power or generate an electrical power during constant speed traveling or in cruising state of the vehicle 30.

(3) Improved Traveling Performance

Each auxiliary power unit 3 can be individually controlled during acceleration or a turning movement at the time of changing lanes to enable a more stable travel of a vehicle.

(4) Travel on Low Friction Road Surface

During initial movement or stopping of a vehicle on a low friction road surface such as when it is raining or when the road is snow-covered, the auxiliary power unit 3 may control the traction of a tire to stabilize the travel of the vehicle. Since the auxiliary power unit 3 is arranged within a wheel in close proximity to a road surface, better maneuverability with faster response can be achieved. Thanks to the provision of the rotation detector 20 (FIG. 3), a built-in brake sensor or the like can be omitted.

(5) Mountability

For a typical, traditional vehicle that is driven by an internal combustion engine, the auxiliary power unit 3 can be mounted with ease to a suspension frame component 39 with only a slight design change of the suspension frame component 39.

Figure 9:
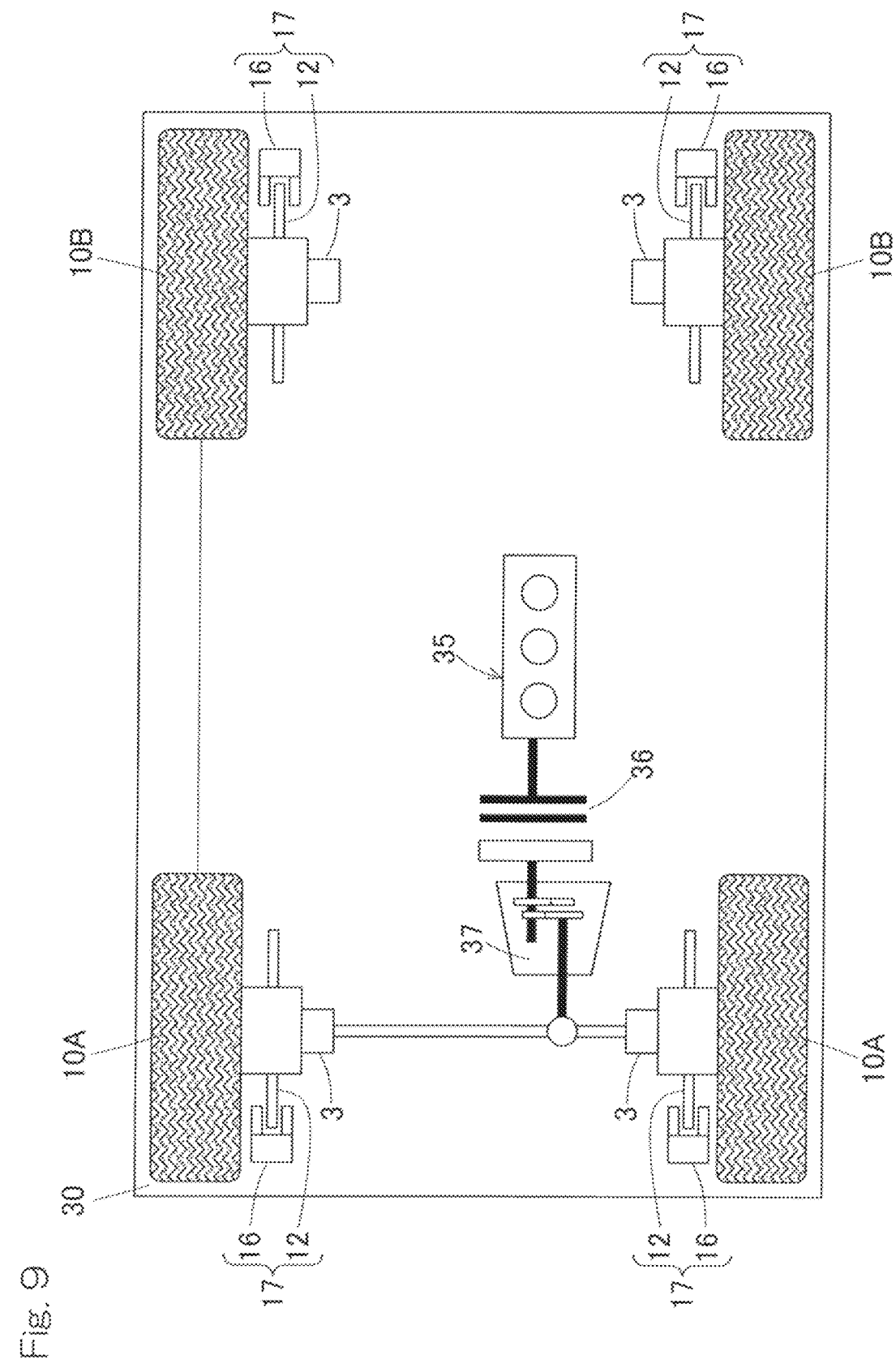
FIG. 9 is an explanatory diagram of the concept of another vehicle power assist system that uses the auxiliary power unit equipped, wheel support bearing assembly.

FIG. 9 illustrates an example in which auxiliary power unit equipped, wheel support bearing assemblies 1 according to the first embodiment or the second embodiment are applied to both of drive wheels 10A that are front wheels and driven wheels 10B that are rear wheels. The drive wheels 10A are driven through a clutch 36 and a speed reducer 37 by a main drive source 35 that is formed of an internal combustion engine. In the illustrated front wheel drive vehicle, auxiliary power unit equipped wheel support bearing assemblies 3 are installed for the support and auxiliary driving of the drive wheels 10A as well as the driven wheels 10B. As is shown in FIG. 9, it can be contemplated to apply an auxiliary power unit equipped, wheel support bearing assembly 3 according to the first or second embodiment to a drive wheel.

Figure 10:
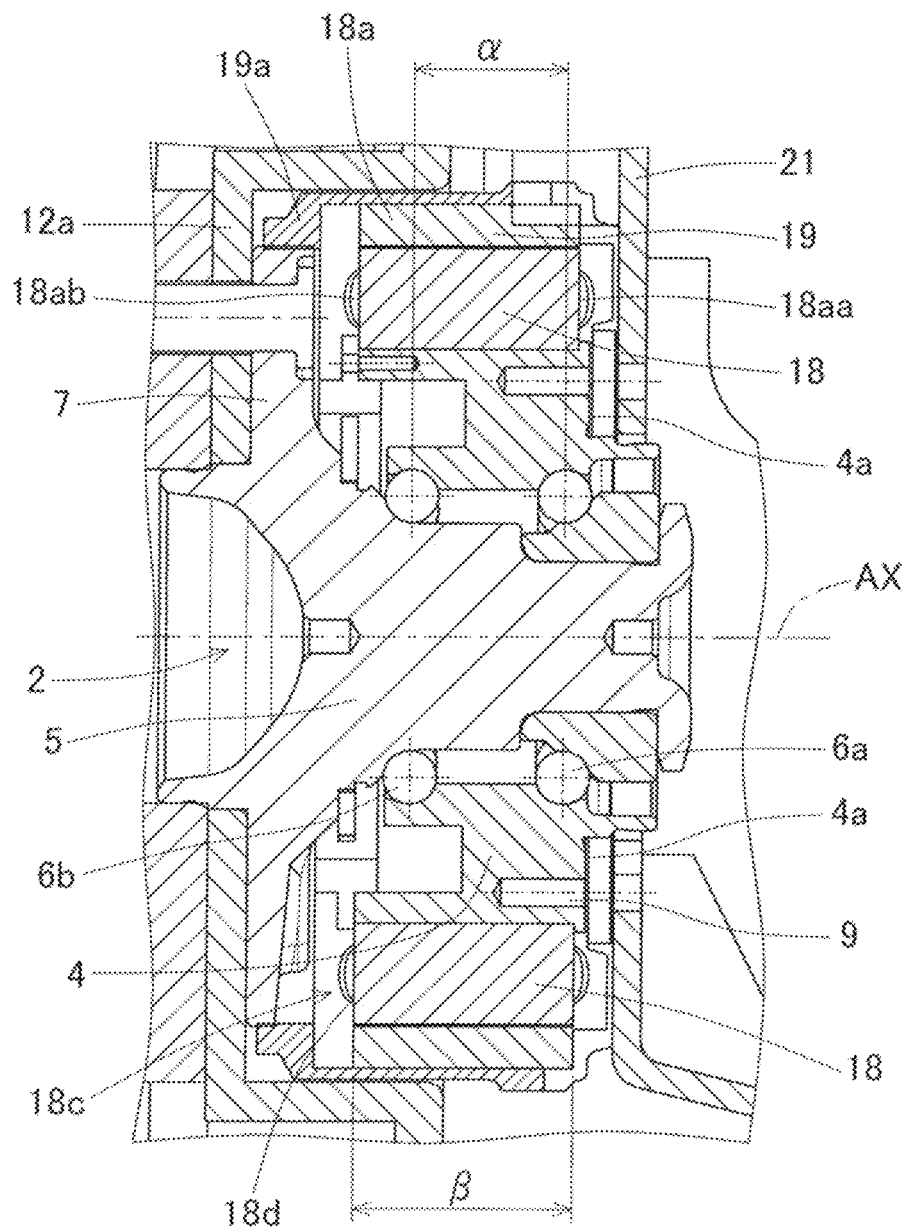
FIG. 10 shows a fragmentary cross-sectional view of the auxiliary power unit equipped, wheel support bearing assembly, in accordance with the first embodiment of the present invention, wherein it is also a fragmentary enlarged view of FIG. 1.

FIG. 10 shows a fragmentary cross-sectional view of the auxiliary power unit equipped, wheel support bearing assembly 1 according to the first embodiment, in which it is also a fragmentary enlarged view of FIG. 1.

As mentioned above, the wheel support bearing assembly 2 includes the outer ring 4 that serves as a stationary ring, the inner ring 5 that serves as a rotational ring, and the plurality of rows of rolling elements 6. The plurality of rows of rolling elements 6 include—as viewed when the wheel support bearing assembly 1 is installed to a vehicle—an inner row of rolling elements 6a that are arranged closer to an interior (the right side of the sheet of FIG. 10) of a vehicle body of the vehicle and an outer row of rolling elements 6b that are arranged closer to an exterior (the left side of the sheet of FIG. 10) of the vehicle body of the vehicle.

Here, an axis of rotation of the wheel support bearing assembly 2 is referred to as an axis AX of rotation, an axial distance—as measured along a direction of the axis AX of rotation—between centers of the inner row of rolling elements 6a and the outer row of rolling elements 6b among the plurality of rows of rolling elements 6 is referred to as a distance $\alpha$, and a width—as measured along the direction of the axis AX of rotation—of the stator 18 of the auxiliary power unit 3 is referred to as a width $\beta$. In the auxiliary power unit equipped, wheel support bearing assembly 1 according to the first embodiment, the relation: the distance α<the width β holds.

By, in this way, configuring the axial width β—as measured along a direction of the axis AX of rotation—of the stator 18 to be greater than the distance α between centers of the plurality of rows of rolling elements 6, the surface area where the stator 18 and the motor rotor 19 face each other can be increased. This results in a greater output of the auxiliary power unit 3.

However, by configuring the distance α<the width β, the bearing is more subject to possible misalignment when a moment load about a direction of the axis AX of rotation acts on an end—as viewed along the direction of the axis AX—of the auxiliary power unit 3. This may cause tilt or backlash between the wheel support bearing assembly and a tire. This issue can be overcome by applying an appropriate preload to the wheel support bearing assembly 2. The width β is configured to be smaller than a range between an inboard end of the hub flange 7 of the wheel support bearing assembly 2 and the outboard mounting face 4a of the wheel support bearing assembly 2 for mounting to the vehicle body of the vehicle. Further, the stator 18 has coil ends 18c, connections and wires 18d that are configured between the inboard end of the hub flange 7 and the outboard mounting face 4a of the wheel support bearing assembly 2 for mounting to the vehicle body of the vehicle. The coil ends 18c refer to projecting portions of the coils 18b, which project axially outwardly with respect to the core 18a.

Also, note that the wheel support bearing assembly 2 in the embodiment under discussion is configured such that a pitch circle diameter of the inner row of rolling elements 6a is equal to a pitch circle diameter of the outer row of rolling elements 6b. However, a wheel support bearing assembly 2 in which a pitch circle diameter of the inner row of rolling elements 6a is different from a pitch circle diameter of the outer row of rolling elements 6b can also be used. Such a configuration still works as long as the distance α—as measured along a direction of the axis AX of rotation—between centers of the inner row of rolling elements 6a and the outer row of rolling elements 6b is greater than the width β of the stator 18.

Furthermore, as shown in FIG. 10, the respective centers of the plurality of rows of rolling elements 6 are, as viewed along a direction of the axis AX of rotation, positioned so as to be situated within the range of the axial width β of the stator 18. In other words, the respective centers of the plurality of rows of rolling elements 6 are positioned within the range between an inner end face 18aa of the stator 18 and an outer end face 18ab of the stator 18.

In some cases, an inner end point of the inner row of rolling elements 6a among the plurality of rows of rolling elements 6 may be positioned inner of a vehicle body of the vehicle (the right side in FIG. 10), than the inner end face 18aa of the stator 18. Still, such a configuration is encompassed by the present invention as long as the inner end face 18aa of the stator 18 is positioned inner of the vehicle body of the vehicle (the right side in FIG. 10), than a center of the inner row of rolling elements 6a.

It should be noted that, although the vehicles used in the discussions of the aforementioned embodiments are either one of a hybrid vehicle and a vehicle that includes only an internal combustion engine as a main drive source 35, the present invention can also be applied to a vehicle that includes only an electric motor as a main drive source 35.

While the present invention has been described with reference to preferred embodiments thereof in connection with the drawings, the present invention is not limited to these embodiments. Various additions, modifications or omissions may be made therein without departing from the gist of the invention. Accordingly, all of such variants are also included within the scope of the present invention.

It should be emphasized that the particular examples of the present invention shown in FIGS. 1 to 11 also encompass the following Implementations 1 to 5.

[Implementation 1]

An auxiliary power unit according to Implementation 1 includes:

a motor generator configured to be associated with a wheel support bearing assembly, the motor generator including a stator configured to be mounted to a stationary ring of the wheel support bearing assembly and a motor rotor configured to be mounted to a rotational ring of the wheel support bearing assembly, wherein an entirety of the auxiliary power unit is sized to extend less than an outer peripheral segment of a brake rotor, which outer peripheral segment defines an area against which a brake caliper is intended to be pushed, and the auxiliary power unit is, with respect to an axial direction, sized to be situated between a hub flange of the wheel support bearing assembly and a mounting face of the wheel support bearing assembly for mounting to a vehicle body of a vehicle.

[Implementation 2]

An auxiliary power unit according to Implementation 2 includes:

a motor generator configured to be associated with a wheel support bearing assembly, the motor generator including a stator configured to be mounted to a stationary ring of the wheel support bearing assembly and a motor rotor configured to be mounted to a rotational ring of the wheel support bearing assembly, wherein the stator has an axial width β that is greater than a distance α between centers of a plurality of rows of rolling elements of the wheel support bearing assembly.

[Implementation 3]

A wheel support bearing assembly according to Implementation 3 is an auxiliary power unit equipped, wheel support bearing assembly which includes:

an auxiliary power unit according to Implementation 2; and the aforementioned wheel support bearing assembly, wherein respective centers of the plurality of rows of rolling elements of the wheel support bearing assembly is positioned within the range of the axial width β of the stator.

[Implementation 4]

A wheel support bearing assembly according to Implementation 4 is an auxiliary power unit equipped, wheel support bearing assembly which includes:

an auxiliary power unit according to Implementation 2; and the aforementioned wheel support bearing assembly, wherein a preload is applied to the wheel support bearing assembly.

[Implementation 5]

A wheel support bearing assembly according to Implementation 5 is an auxiliary power unit equipped, wheel support bearing assembly which includes:

an auxiliary power unit according to Implementation 2; and the aforementioned wheel support bearing assembly, wherein the rotational ring having a hub flange to which a wheel of a vehicle and a brake rotor are intended to be mounted, and the stator has coil ends, connections and wires, all of which are arranged between an inboard end of the hub flange and an outboard mounting face of the wheel support bearing assembly for mounting to a vehicle body of the vehicle.

REFERENCE NUMERALS

1 . . . auxiliary power unit equipped, wheel support bearing assembly
2 . . . wheel support bearing assembly
3 . . . auxiliary power unit
4 . . . outer ring (stationary ring)
4a . . . mounting face for mounting to vehicle body
5 . . . inner ring (rotational ring)
6 . . . rolling element
7 . . . hub flange
8 . . . suspension frame component
10 . . . wheel
11 . . . rim
12 . . . brake rotor
12a . . . flat plate segment
12b . . . outer peripheral segment
13 . . . hub bolt
14 . . . tire
16 . . . brake caliper
17 . . . brake assembly
18 . . . stator
19 . . . motor rotor
18a . . . core
18b . . . coil
18c . . . coil end
19a . . . rotatable casing
20 . . . rotation detector

What is claimed is:

1. An auxiliary power unit equipped wheel support bearing assembly comprising:
    a wheel support bearing assembly including a stationary ring, a rotational ring and rolling elements, the rotational ring having a hub flange to which a wheel of a vehicle and a brake rotor are intended to be mounted, the rotational ring being rotatably supported via the rolling elements by the stationary ring; and
    an auxiliary power unit including a motor generator, the motor generator including a stator mounted to the stationary ring and a motor rotor mounted to the rotational ring, wherein
    an entirety of the auxiliary power unit is sized to extend less than an outer peripheral segment of the brake rotor, which outer peripheral segment defining an area against which a brake caliper is intended to be pushed, and
    the auxiliary power unit is, with respect to an axial direction, sized to be situated between the hub flange of the wheel support bearing assembly and a mounting face of the wheel support bearing assembly for mounting to a vehicle body of the vehicle.

2. The auxiliary power unit equipped wheel support bearing assembly as claimed in claim 1, wherein the wheel support bearing assembly is configured to support a driven wheel that is mechanically unconnected to a main drive source of the vehicle.

3. The auxiliary power unit equipped wheel support bearing assembly as claimed in claim 1, wherein the wheel support bearing assembly is configured to support a drive wheel that is mechanically connected to a main drive source of the vehicle.

4. The auxiliary power unit equipped wheel support bearing assembly as claimed in claim 1, wherein the stationary ring of the wheel support bearing assembly is an outer ring, and the rotational ring thereof is an inner ring.

5. The auxiliary power unit equipped, wheel support bearing assembly as claimed in claim 4, wherein:
    the auxiliary power unit includes a rotatable casing that is fixed to an outer diameter surface of the hub flange of the inner ring;
    the motor rotor is fixed to an inner periphery of the rotatable casing; and
    the stator is fixed to an outer periphery of the outer ring.

6. The auxiliary power unit equipped wheel support bearing assembly as claimed in claim 4, further comprising a rotation detector configured to detect a rotational speed of the inner ring relative to the outer ring, wherein
    the rotation detector is associated between an end of the outer ring, which is proximal to the hub flange of the inner ring, and the inner ring.

7. The auxiliary power unit equipped wheel support bearing assembly as claimed in claim 4, wherein:
    the auxiliary power unit includes a rotatable casing that is fixed to a lateral face of the hub flange of the inner ring, which is opposite to a mounting face of the hub flange to which the wheel is intended to be mounted;
    the motor rotor is fixed to an inner periphery of the rotatable casing; and
    the stator is fixed to an outer periphery of the outer ring.

8. The auxiliary power unit equipped wheel support bearing assembly as claimed in claim 7, further comprising a rotation detector configured to detect a rotational speed of the inner ring relative to the outer ring, wherein
    the rotation detector is associated between an end of the inner ring, which is opposite to the hub flange of the inner ring, and a suspension frame component to which the outer ring is intended to be secured.

9. The auxiliary power unit equipped wheel support bearing assembly as claimed in claim 1, wherein the stator has an axial width $\beta$ that is greater than a distance $\alpha$ between centers of a plurality of rows of the rolling elements of the wheel support bearing assembly.

10. The auxiliary power unit equipped wheel support bearing assembly as claimed in claim 9, wherein a preload is applied to the wheel support bearing assembly.

11. The auxiliary power unit equipped wheel support bearing assembly as claimed in claim 9, wherein the stator has coil ends, connections and wires, all of which are arranged between an inboard end of the hub flange and the outboard mounting face of the wheel support bearing assembly for mounting to the vehicle body of the vehicle.

12. The auxiliary power unit equipped wheel support bearing assembly as claimed in claim 1, wherein the stator is directly mounted to the stationary ring.

* * * * *